(12) United States Patent
Ichimura

(10) Patent No.: US 8,345,375 B2
(45) Date of Patent: Jan. 1, 2013

(54) STORAGE APPARATUS, CARRIAGE SHIFTING METHOD AND PROGRAM THEREOF

(75) Inventor: Takahiro Ichimura, Tokyo (JP)

(73) Assignee: NEC Corporation, Tokyo (JP)

( * ) Notice: Subject to any disclaimer, the term of this patent is extended or adjusted under 35 U.S.C. 154(b) by 1340 days.

(21) Appl. No.: 11/949,496

(22) Filed: Dec. 3, 2007

(65) Prior Publication Data

US 2008/0137522 A1    Jun. 12, 2008

(30) Foreign Application Priority Data

Dec. 6, 2006   (JP) .................................. 2006-329839

(51) Int. Cl.
 *G11B 17/22* (2006.01)
 *G11B 7/085* (2006.01)
(52) U.S. Cl. .................. 360/92.1; 369/30.43; 369/30.55
(58) Field of Classification Search .................. 360/92.1; 369/30.43, 30.55
 See application file for complete search history.

(56) References Cited

U.S. PATENT DOCUMENTS

| | | | | |
|---|---|---|---|---|
| 4,989,191 A * | 1/1991 | Kuo | ............................ | 369/30.76 |
| 5,128,912 A * | 7/1992 | Hug et al. | .................. | 369/30.61 |
| 5,546,366 A * | 8/1996 | Dang | ........................ | 369/30.39 |
| 5,818,723 A * | 10/1998 | Dimitri | ........................ | 700/214 |
| 5,940,356 A * | 8/1999 | Toumbas | .................... | 369/30.39 |
| 6,064,544 A * | 5/2000 | Wada | ........................... | 360/92.1 |
| 6,088,305 A * | 7/2000 | Meadows | ................... | 369/30.63 |
| 6,160,786 A * | 12/2000 | Coffin et al. | ................ | 369/30.43 |
| 6,166,877 A * | 12/2000 | Tadokoro et al. | ............ | 360/92.1 |
| 6,469,850 B2 * | 10/2002 | Luffel et al. | ................ | 369/30.43 |
| 6,549,358 B1 * | 4/2003 | Billy et al. | ........................ | 360/69 |
| 6,690,994 B1 * | 2/2004 | Smith et al. | ................... | 700/218 |
| 6,925,034 B2 * | 8/2005 | Coffin et al. | ................ | 369/30.29 |
| 7,158,326 B2 * | 1/2007 | Hanagata | ......................... | 360/69 |
| 7,328,442 B2 * | 2/2008 | Porter | ........................ | 720/632 |
| 7,334,978 B2 * | 2/2008 | Coffin et al. | ................... | 414/273 |
| 7,387,485 B2 * | 6/2008 | Dickey et al. | ................. | 414/277 |
| 7,480,118 B2 * | 1/2009 | Ojima et al. | ................. | 360/92.1 |
| 7,502,199 B2 * | 3/2009 | Hori et al. | .................... | 360/92.1 |
| 2002/0006030 A1 * | 1/2002 | Evanson et al. | ................ | 361/724 |
| 2002/0167754 A1 * | 11/2002 | Donkin et al. | ................... | 360/92 |
| 2004/0091339 A1 * | 5/2004 | Arnal et al. | ..................... | 414/280 |
| 2005/0007692 A1 * | 1/2005 | Thompson et al. | ............ | 360/93 |
| 2008/0062558 A1 * | 3/2008 | McIntosh et al. | ............... | 360/90 |

FOREIGN PATENT DOCUMENTS

| | | |
|---|---|---|
| JP | 1975031565 A | 3/1975 |
| JP | 1992005378 A | 1/1992 |
| JP | 1994139678 A | 5/1994 |
| JP | 11096641 | 4/1999 |
| JP | 2001159256 A | 6/2001 |
| JP | 2001184768 A | 7/2001 |
| WO | 8606434 A1 | 11/1986 |

OTHER PUBLICATIONS

Japanese Office Action dated Jan. 20, 2009 for JP Application No. 2006-329839.
Japanese Office Action dated Oct. 21, 2008 for JP Application No. 2006-329839.

* cited by examiner

*Primary Examiner* — Brian Miller

(57) ABSTRACT

A storage apparatus includes carriages that are arranged in a matrix and store and transport objects, and a carriage shifting mechanism that is fixed to the storage apparatus and shifts the carriages.

9 Claims, 25 Drawing Sheets

|  | X=1 | X=2 | X=3 |
|---|---|---|---|
| Y=1 | MA | MB | MC |
| Y=2 | MD | ME | MF |
| Y=3 | MG | MH | MI |
| Y=4 | Space | MJ | MK |

51 MEDIA POSITION TABLE

| | X=1 | X=2 | X=3 |
|---|---|---|---|
| Y=1 | MA | MB | MC |
| Y=2 | MD | ME | MF |
| Y=3 | MG | MH | MI |
| Y=4 | Space (SX,SY) | MJ | MK (TX,TY) |

LEFTWARD SHIFT

| | X=1 | X=2 | X=3 |
|---|---|---|---|
| Y=1 | MA | MB | MC |
| Y=2 | MD | ME | MF |
| Y=3 | MG | MH | MI |
| Y=4 | MJ | MK | Space |

DRAWING OF UPDATE OF MEDIA POSITION TABLE 51 BY LEFTWARD SHIFT

START FROM ITEM OF [X SHIFT]

SHIFT TO SAME X-COORDINATE (COLUMN) AS X-COORDINATE (COLUMN) OF DESTINATION POSITION

[X SHIFT]
(X1) IF X-COORDINATES OF TARGET AND DESTINATION POSITION ARE SAME, PROCEED TO [Y SHIFT]
(X2) IF X-COORDINATE OF TARGET IS AT LEFT SIDE OF DESTINATION POSITION, PROCEED TO [RIGHTWARD SHIFT]
(X3) IF X-COORDINATE OF TARGET IS AT RIGHT SIDE OF DESTINATION POSITION, PROCEED TO [LEFTWARD SHIFT]

[LEFTWARD SHIFT]
(LEFTWARD 1) IF Y-COORDINATES OF SPACE AND TARGET ARE SAME AND SPACE IS AT LEFT SIDE OF TARGET, SHIFT TARGET TRAY LEFTWARDS AND PROCEED TO [X SHIFT]
(LEFTWARD 2) IF X-COORDINATE OF SPACE IS AT LEFT SIDE OF TARGET, SHIFT TRAY WITH SAME Y-COORDINATE AS TARGET AND SAME X-COORDINATE AS SPACE IN DIRECTION TOWARD SPACE (UPWARD OR DOWNWARD) AND PROCEED TO [X SHIFT]
(LEFTWARD 3) IF Y-COORDINATES OF SPACE AND TARGET ARE NOT SAME, SHIFT TRAY WITH SAME Y-COORDINATE AS SPACE AND X-COORDINATE NEXT (LEFT) TO TARGET IN DIRECTION TOWARD SPACE (RIGHTWARD) AND PROCEED TO [X SHIFT]
(LEFTWARD 4) SHIFT TRAY WITH NEXT (UPPER OR LOWER) Y-COORDINATE TO TARGET AND SAME X-COORDINATE AS SPACE IN DIRECTION TOWARD SPACE (UPWARD OR DOWNWARD) AND PROCEED TO [X SHIFT]

[RIGHTWARD SHIFT]
(RIGHTWARD 1) IF Y-COORDINATES OF SPACE AND TARGET ARE SAME AND SPACE IS AT RIGHT SIDE OF TARGET, SHIFT TARGET TRAY RIGHTWARDS AND PROCEED TO [X SHIFT]
(RIGHTWARD 2) IF X-COORDINATE OF SPACE IS AT RIGHT SIDE OF TARGET, SHIFT TRAY WITH SAME Y-COORDINATE AS TARGET AND SAME X-COORDINATE AS SPACE IN DIRECTION TOWARD SPACE (UPWARD OR DOWNWARD) AND PROCEED TO [X SHIFT]
(RIGHTWARD 3) IF Y-COORDINATES OF SPACE AND TARGET ARE NOT SAME, SHIFT TRAY WITH SAME Y-COORDINATE AS SPACE AND X-COORDINATE NEXT (RIGHT) TO TARGET IN DIRECTION TOWARD SPACE (LEFTWARD) AND PROCEED TO [X SHIFT]
(RIGHTWARD 4) SHIFT TRAY WITH NEXT (UPPER OR LOWER) Y-COORDINATE TO TARGET AND SAME X-COORDINATE AS SPACE IN DIRECTION TOWARD SPACE (UPWARD OR DOWNWARD) AND PROCEED TO [X SHIFT]

FIG.14A

SHIFT TO SAME Y-COORDINATE (ROW) AS Y-COORDINATE (ROW) OF DESTINATION POSITION

[Y SHIFT]
(Y1) IF Y-COORDINATES OF TARGET AND DESTINATION POSITION ARE SAME, PROCEED TO [SHIFT COMPLETED]
(Y2) IF Y-COORDINATE OF TARGET IS AT UPPER SIDE OF DESTINATION POSITION, PROCEED TO [DOWNWARD SHIFT]
(Y3) IF Y-COORDINATE OF TARGET IS AT LOWER SIDE OF DESTINATION POSITION, PROCEED TO [UPWARD SHIFT]

[UPWARD SHIFT]
(UPWARD 1) IF X-COORDINATES OF SPACE AND TARGET ARE SAME AND SPACE IS AT UPPER SIDE OF TARGET, SHIFT TARGET TRAY UPWARDS AND PROCEED TO [Y SHIFT]
(UPWARD 2) IF Y-COORDINATE OF SPACE IS AT UPPER SIDE OF TARGET, SHIFT TRAY WITH SAME X-COORDINATE AS TARGET AND SAME Y-COORDINATE AS SPACE IN DIRECTION TOWARD SPACE (RIGHTWAR OR LEFTWARD) AND PROCEED TO [Y SHIFT]
(UPWARD 3) IF X-COORDINATES OF SPACE AND TARGET ARE NOT SAME, SHIFT TRAY WITH SAME X-COORDINATE AS SPACE AND Y-COORDINATE NEXT TO TARGET (UPPER) IN DIRECTION TOWARD SPACE (DOWNWARD) AND PROCEED TO [Y SHIFT]
(UPWARD 4) SHIFT TRAY WITH X-COORDINATE NEXT (RIGHT OR LEFT) TO TARGET AND SAME Y-COORDINATE AS SPACE IN DIRECTION TOWARD SPACE (RIGHTWARD OR LEFTWARD) AND PROCEED TO [Y SHIFT]

[DOWNWARD SHIFT]
(DOWNWARD 1) IF X-COORDINATES OF SPACE AND TARGET ARE SAME AND SPACE IS AT LOWER SIDE OF TARGET, SHIFT TARGET TRAY DOWNWARDS AND PROCEED TO [Y SHIFT]
(DOWNWARD 2) IF Y-COORDINATE OF SPACE IS AT LOWER SIDE OF TARGET, SHIFT TRAY WITH SAME X-COORDINATE AS TARGET AND SAME Y-COORDINATE AS SPACE IN DIRECTION TOWARD SPACE (RIGHTWARD OR LEFTWARD) AND PROCEED TO [Y SHIFT]
(DOWNWARD 3) IF X-COORDINATES OF SPACE AND TARGET ARE NOT SAME, SHIFT TRAY WITH SAME X-COORDINATE AS SPACE AND Y-COORDINATE NEXT (UPPER) TO TARGET IN DIRECTION TOWARD SPACE (UPWARD) AND PROCEED TO [Y SHIFT]
(DOWNWARD 4) SHIFT TRAY WITH X-COORDINATE NEXT (RIGHT OR LEFT) TO TARGET AND SAME Y-COORDINATE AS SPACE IN DIRECTION TOWARD SPACE (RIGHTWARD OR LEFTWARD) AND PROCEED TO [Y SHIFT]

FIG.14B

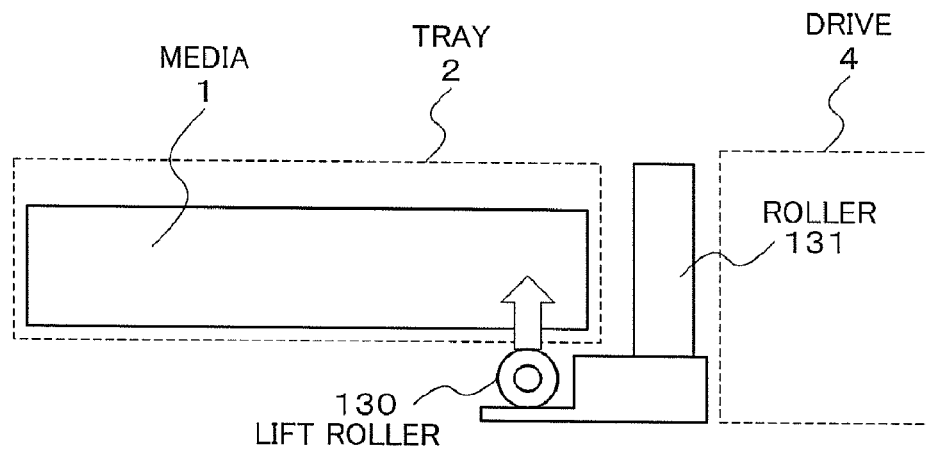
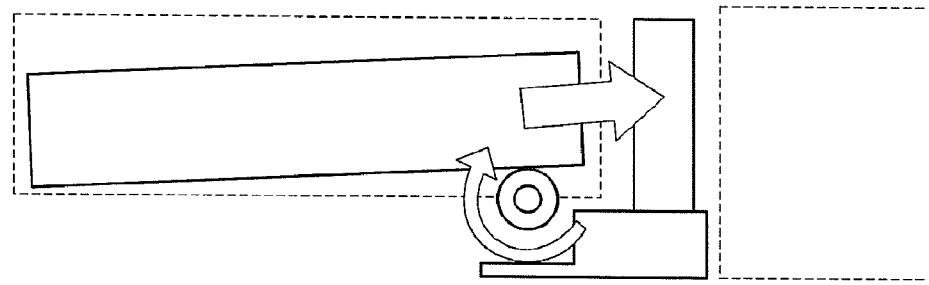
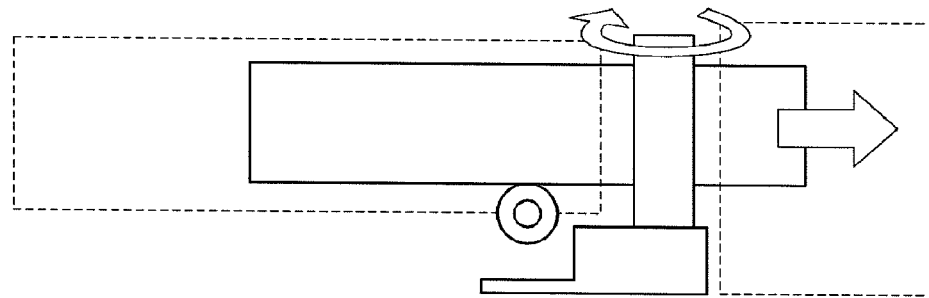

STORAGE APPARATUS, CARRIAGE SHIFTING METHOD AND PROGRAM THEREOF

This application is based upon and claims the benefit of priority from Japanese patent application No. 2006-329839, filed on Dec. 6, 2006, the disclosure of which is incorporated herein in its entirety by reference.

BACKGROUND OF THE INVENTION

1. Field of the Invention

The present invention relates to a storage apparatus, a carriage shifting method and a program thereof, and particularly to a storage apparatus, a carriage shifting method and a program thereof with an improved object storing capacity.

2. Description of the Related Art

Japanese Patent Laid-Open No. 11-096641 discloses one example of a storage apparatus (e.g., library device) including carriages being arranged in a matrix and for storing and transporting objects (e.g., media). An automatic changer of disc-like recording media disclosed in Japanese Patent Laid-Open No. 11-096641 includes a plurality of subunits for storing numerous disc-like recording media. The subunits shift back and forth between their setting positions and a recording media eject position.

SUMMARY OF THE INVENTION

An exemplary object of the invention is to provide a storage apparatus, a carriage shifting method and a program thereof to solve a problem in Japanese Patent Laid-Open No. 11-096641 described in the above, that is, a problem of a complex mechanism for power to shift the carriages being arranged in a matrix and for storing and transporting objects.

A storage apparatus according to an exemplary aspect of the invention includes carriages that are arranged in a matrix and store and transport objects, and a carriage shifting mechanism that is fixed to the storage apparatus and shifts the carriages.

A carriage shifting method according to an exemplary aspect of the invention includes shifting carriages that are arranged in a matrix and store and transport objects from the outside of the carriages by applying force.

A computer readable medium embodying a program, the program causing a storage apparatus including carriages that are arranged in a matrix and store and transport objects to perform a method, according to an exemplary aspect of the invention includes issuing an instruction to shift the carriages from the outside of the carriages by applying force.

A storage apparatus according to an exemplary aspect of the invention includes carriage means for being arranged in a matrix and for storing and transporting objects, and carriage shifting means for being fixed to the storage apparatus and for shifting the carriage means.

A carriage shifting method according to an exemplary aspect of the invention includes a step for shifting carriages that are arranged in a matrix and store and transport objects from the outside of the carriages by applying force.

BRIEF DESCRIPTION OF THE DRAWINGS

Exemplary features and advantages of the present invention will become apparent from the following detailed description when taken with the accompanying drawings in which:

FIGS. 14A-B are exemplary tables showing a detailed operation by the shifting unit to shift target tray 2 to a destination position in the first exemplary embodiment;

FIG. 23A is an exemplary side view of configuration of a media inject/eject mechanism according to a fifth exemplary embodiment (lifting up lift roller 130).

FIG. 23B is an exemplary side view of configuration of a media inject/eject mechanism according to a fifth exemplary embodiment (delivering media 1).

FIG. 23C is an exemplary side view of configuration of a media inject/eject mechanism according to a fifth exemplary embodiment (injecting media 1 into drive 4).

DESCRIPTION OF THE EXEMPLARY EMBODIMENTS

Next, a first exemplary embodiment will be described.

Figure 10:
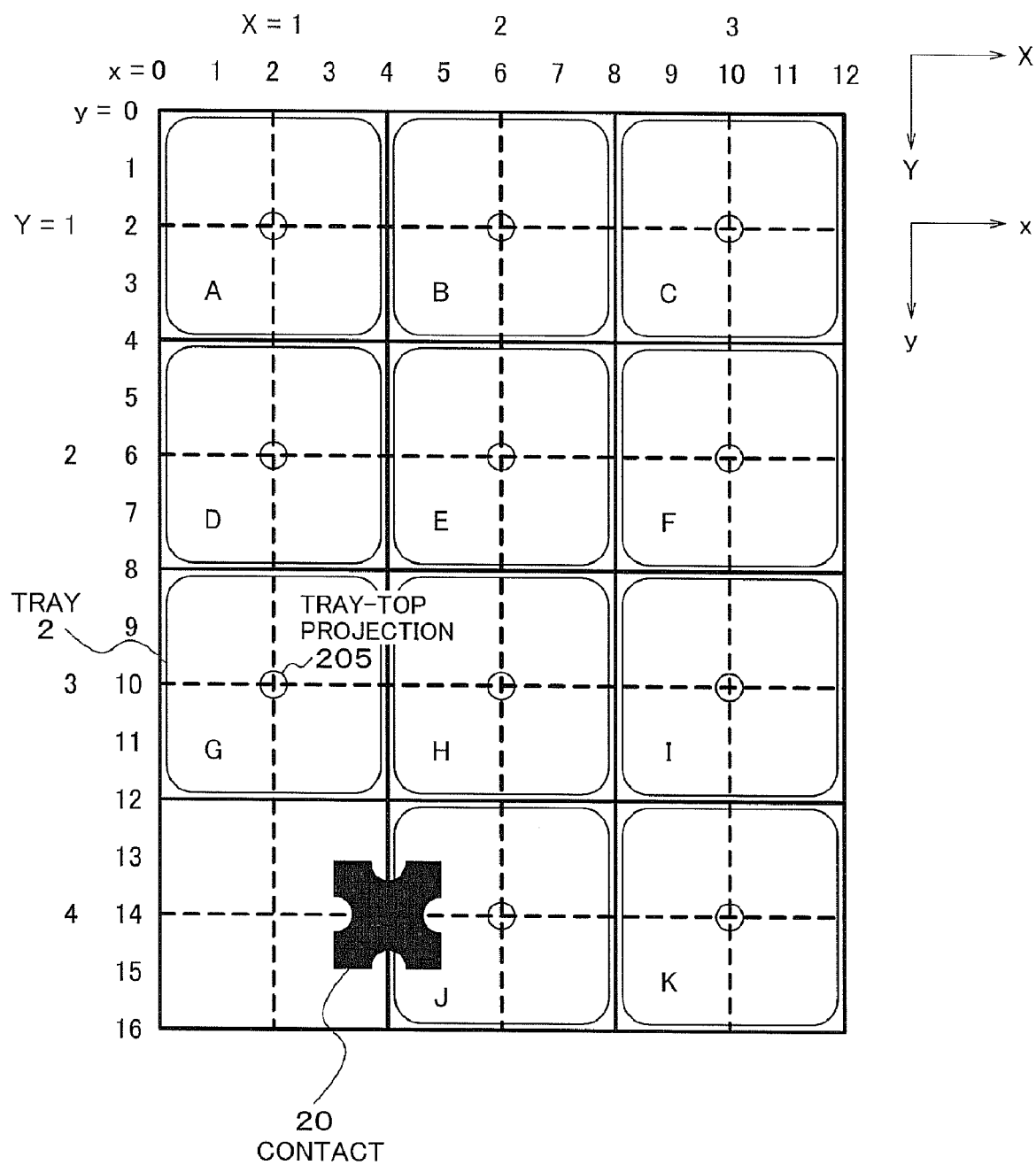
FIG. 10 is an exemplary drawing showing a positional relation between contact 20 and tray-top projection 205 in the first exemplary embodiment.

The following will describe the first exemplary embodiment based on definition of coordinates as follows: first, X-Y coordinates corresponding to a position of tray 2 (corresponding to a matrix element) are defined as shown in FIG. 10. In FIG. 10, a row direction is defined as an X direction (a lateral direction), a column direction is defined as a Y direction (a lengthwise direction) and a position of a matrix element is defined as (X, Y) (X and Y are integers). In FIG. 10, the position of top left tray 2 is represented as (X, Y)=(1, 1). A farther right position has a larger X value, while a lower position has a larger Y value. Trays 2 are arranged in a matrix on the X-Y coordinates. Further, a Z coordinate is defined along a direction perpendicular to the surface of paper in FIG. 10. A front side of the paper surface is defined as a Z positive coordinate, while a back side of the paper surface is defined as a Z negative coordinate.

Furthermore, as shown in FIG. 10, x-y coordinates corresponding to a position of contact 20 is defined, being more detailed than the X-Y coordinates. In FIG. 10, the top left position is (x, y)=(0, 0). A farther right position has a larger x value, while a lower position has a larger y value. It is defined that $\Delta X=1$ corresponds to $\Delta x=4$ and $\Delta Y=1$ corresponds to $\Delta y=4$. That is, one tray 2 being an element of a matrix equals to four x's or y's.

Further, a position of tray 2 to be shifted on the X-Y coordinates is represented as (TX, TY), while a position of a space without tray 2 is represented as (SX, SY). Furthermore, a position of tray-top projection 205 of tray 2 to be shifted on the x-y coordinates is represented as (tx, ty), a position where contact 20 is next positioned is represented as (dx, dy), the current position of contact 20 is represented as (cx, cy), and the center of a space is represented as (sx, sy).

Contact 20 touches tray-top projection 205 of tray 2 at a position that either of x or y differs from a position of tray-top projection 205 of tray 2 by one on the x-y coordinates. That is, if x-y coordinates of contact 20 is one of (tx+1, ty), (tx−1, ty), (tx, ty+1) and (tx, ty−1), contact 20 touches tray-top projection 205 at (tx, ty). As described later, contact 20 touches tray-top projection 205 of tray 2 to be shifted and shifts tray 2 by pushing tray 2 in a direction toward the space.

Next, configuration of the first exemplary embodiment will be described.

Figure 1:
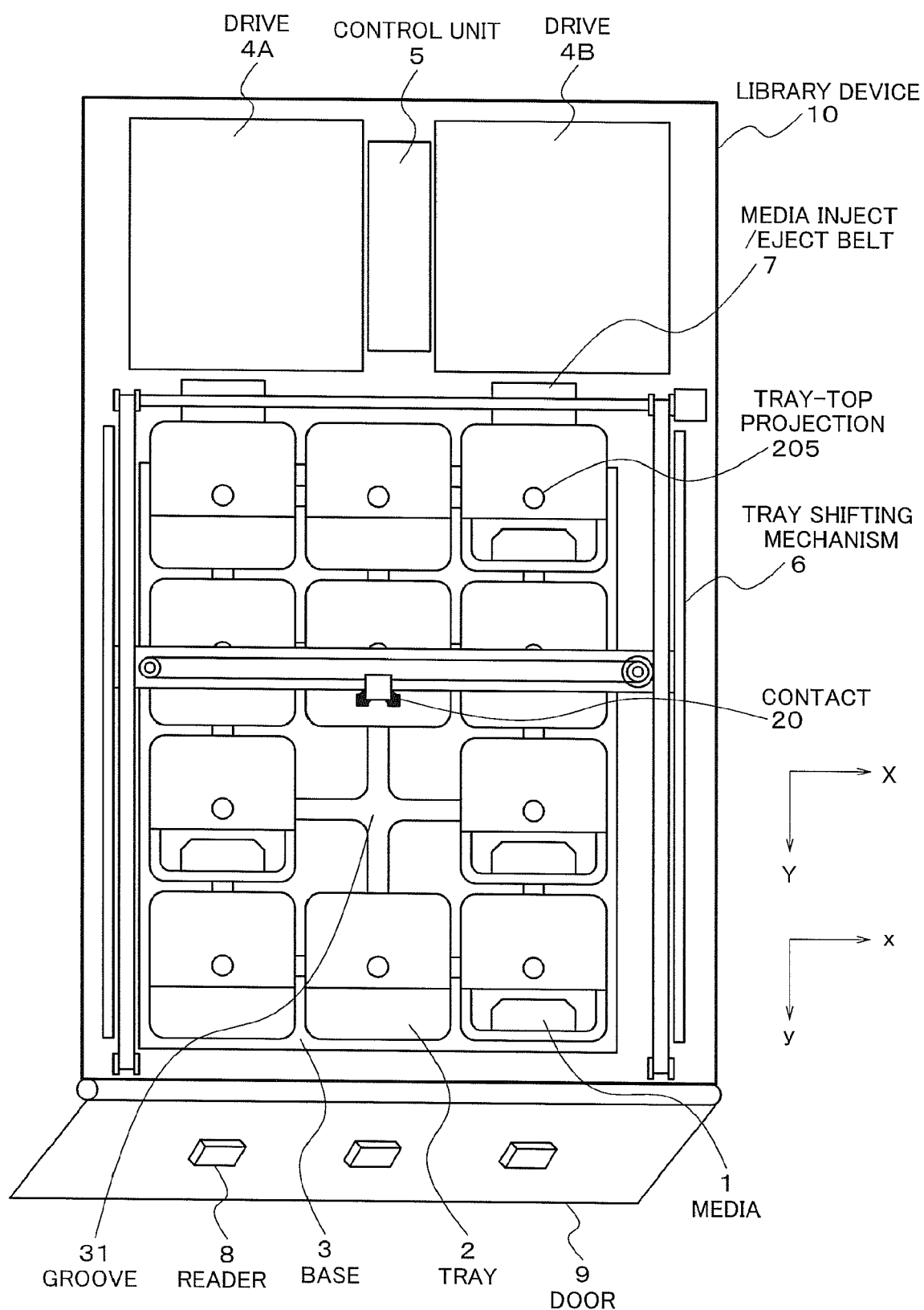
FIG. 1 is an exemplary drawing showing a configuration example of a storage apparatus according to a first exemplary embodiment.

FIG. 1 is an exemplary drawing showing a configuration example of a storage apparatus (e.g., library device 10 (hereinafter, library device 10 will be described as one example of the storage apparatus)) according to the first exemplary embodiment.

Library device 10 according to the first exemplary embodiment includes a plurality of carriages (e.g., tray 2 (hereinafter, tray 2 will be described as one example of the carriage)), base 3, a plurality of drives 4, control unit 5, tray shifting mechanism 6, a plurality of media inject/eject belts 7, a plurality of readers 8 and door 9.

In FIG. 1, trays 2 are arranged on a 4×3 matrix, wherein the number of trays 2 is 4 (length)×3 (width)−1=11. The size of a matrix on which trays 2 are arranged is not limited to it. The number of trays 2 may be smaller, for example, trays 2 may be arranged on a 2×2 matrix. Also, trays 2 may be arranged on a matrix larger than 2×2 (for example, a 4×3 or larger matrix) depending on a size of library device 10.

Tray 2 stores an object (e.g., media 1 (hereinafter, media 1 will be described as one example of the object)). Tray 2 transports media 1 by shifting from one element to another adjacent element of a matrix, i.e., by sliding in the X or Y direction on base 3. Tray 2 includes top and bottom projections. A projection on the top of tray 2 (tray-top projection 205 (see FIG. 18A)) touches contact 20 of tray shifting mechanism 6 when tray 2 shifts. A projection on the bottom of tray 2 (not shown) is guided in the X or Y direction through groove 31 of base 3. The bottom of tray 2 includes a hole such that media inject/eject belt 7 can touch media 1 in tray 2.

A carriage for storing and transporting media 1 is tray 2. However, the carriage is not limited to tray 2, but may be anything that can store and transport media 1 and can be arranged on a matrix. For example, the carriage may be a cell for enveloping media 1 or a stand for supporting a part of media 1.

Base 3 includes guiding groove 31 for sliding tray 2 in the X and Y directions smoothly. Base 3 is fixed to a casing of library device 10.

Drive 4 records and plays back data in media 1. Library device 10 includes two drives 4, or drives 4A and 4B. The number of drives 4 is not limited to two, but library device 10 may include one or more drives 4.

Control unit 5 and tray shifting mechanism 6 function as a shifting unit. For example, when first tray 2 shifts to the position of second tray 2, then tray shifting mechanism 6 shifts third tray 2 to a position differing from positions of first and second trays 2 and shifts second tray 2 to the position of third tray 2 through control by control unit 5.

Figures 2, 3:
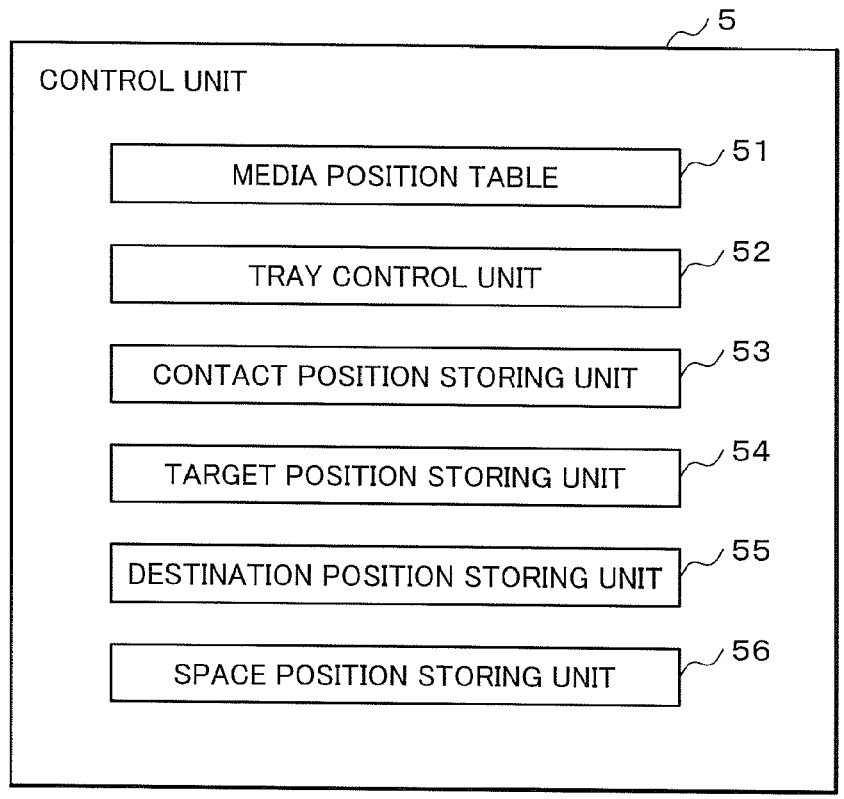
FIG. 2 is an exemplary functional block diagram showing functions of control unit 5 according to the first exemplary embodiment.
FIG. 3 is an exemplary drawing showing configuration of media position table 51 according to the first exemplary embodiment.

FIG. 2 is an exemplary functional block diagram showing functions of control unit 5 according to the first exemplary embodiment.

Control unit 5 includes media position table 51, tray control unit 52, contact position storing unit 53, target position storing unit 54, destination position storing unit 55 and space position storing unit 56.

FIG. 3 is an exemplary drawing showing configuration of media position table 51 according to the first exemplary embodiment. Media position table 51 indicates which matrix element stores which media 1.

For example, media position table 51 in FIG. 3 indicates that (X, Y)=(1, 1) stores MA (Media A), (X, Y)=(2, 1) stores MB (Media B), and (X, Y)=(1, 4) stores no tray 2, but is a space.

Tray control unit 52 updates and uses information of media position table 51, contact position storing unit 53, target position storing unit 54, destination position storing unit 55 and space position storing unit 56 and controls operation of the entire library device 10 including shift of tray 2, depending on a request by an operator or a host device.

Tray control unit 52 also issues an instruction to tray shifting mechanism 6 to shift tray 2 described later. Tray control unit 52, which is a micro processor (a CPU (Central Processing Unit) or an MPU (Micro Processing Unit)) that operates through program control, for example, controls operation of the entire library device 10 according to a program stored in program storage media.

Program storage media includes a magnetic disc, a magnetic tape, a semiconductor memory or an optical disc such as a CD-ROM (Compact Disk Read Only Memory) or a DVD (Digital Versatile Disk).

Tray control unit 52 may also control library device 10 according not only to a program stored in program storage media, but also to a program downloaded from a server via communication media. When a program is downloaded via program storage media or communication media, tray control unit 52 may read out and operate the program from a download server directly, or may store the program in a storing unit from the program storage media or the server, then read out and operate the program stored in the storing unit.

Contact position storing unit 53 stores a current position of contact 20. The position is updated by tray control unit 52 each time contact 20 shifts.

Target position storing unit 54 stores a position of target tray 2 to be shifted. Information in target position storing unit 54 is updated based on information in media position table 51 each time concerned target tray 2 shifts.

Destination position storing unit 55 stores a destination position determined by tray control unit 52 depending on drive 4 of a shift destination indicated by an operator or a host device (not shown).

Space position storing unit 56 stores a position of a space (SX, SY) stored in media position table 51.

Figure 4:
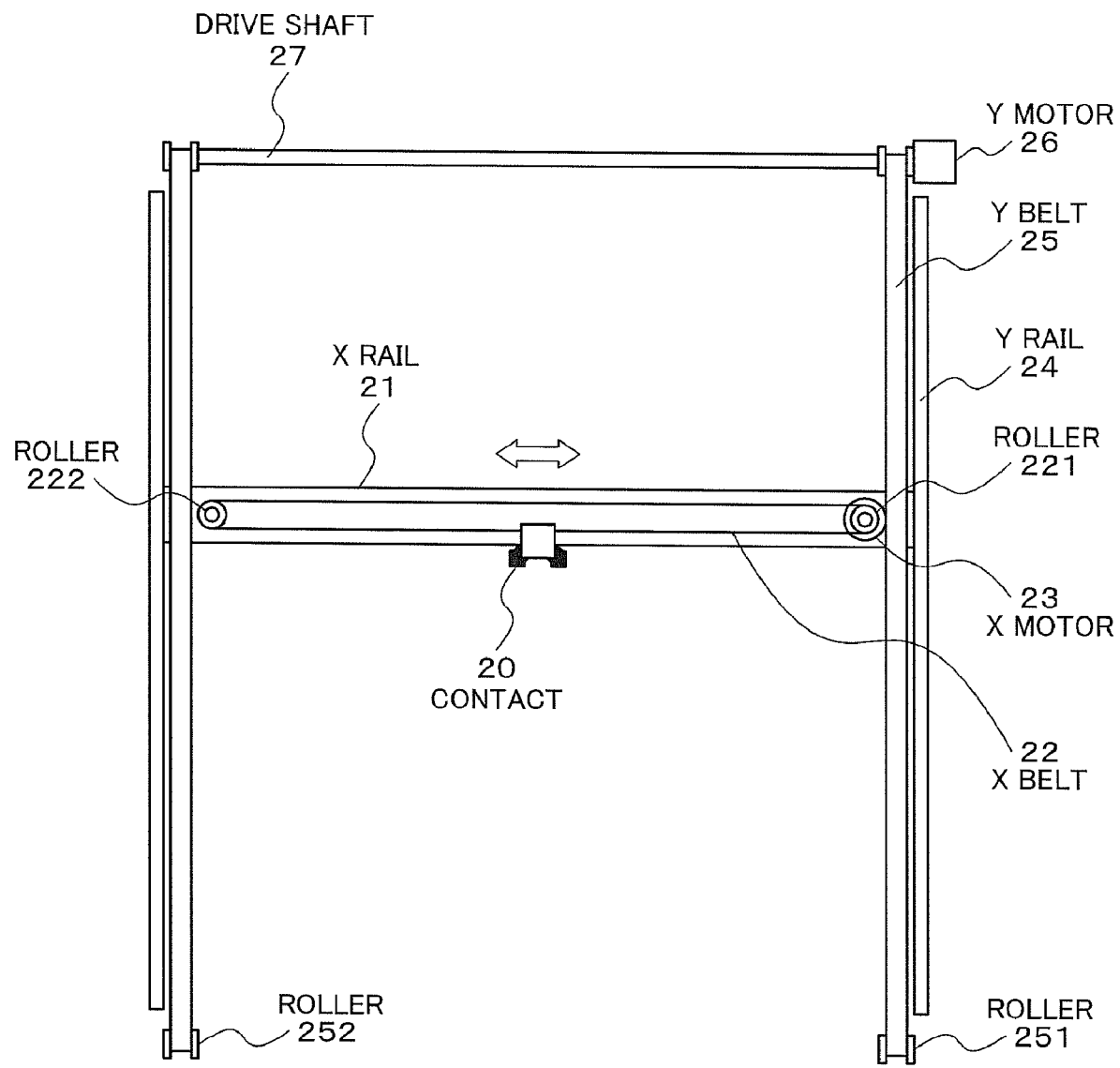
FIG. 4 is an exemplary drawing showing detailed configuration of tray shifting mechanism 6 according to the first exemplary embodiment.

FIG. 4 is an exemplary drawing showing detailed configuration of tray shifting mechanism 6 according to the first exemplary embodiment.

Tray shifting mechanism 6 shifts tray 2 in the X and Y directions. Tray shifting mechanism 6 includes contact 20, X rail 21, X belt 22, X motor 23, Y rails 24, Y belts 25, Y motor 26 and drive shaft 27. Tray shifting mechanism 6 is fixed to base 3.

Contact 20 touches tray-top projection 205 (see FIG. 18A) on the top of tray 2 (the front side in a direction perpendicular to the paper surface), and shifts tray 2 by pushing it. Contact 20 can be shifted in the X and Y directions on a matrix.

X rail 21 shifts contact 20 in the X direction. X rail 21 slidably supports contact 20 and rotatably supports rollers 221 and 222 described later.

X belt 22 transmits power of X motor 23 to shift contact 20 in the X direction.

Rollers 221 and 222 are positioned on both edges of X belt 22. Rollers 221 and 222 rotate and slide X belt 22 and shift contact 20 attached to X belt 22 in the X direction.

X motor 23 is a power unit for shifting contact 20 in the x direction by rotating roller 221.

Y rail 24 shifts contact 20 in the Y direction by shifting X rail 21. Y rail 24 slidably supports X rail 21.

Y belt 25 transmits power of Y motor 26 to shift contact 20 in the Y direction. Drive shaft 27 on one edge of Y belt 25 and rollers 251 and 252 on the other edge rotate and slide Y belt 25 and shift X rail 21 attached to Y belt 25 in the Y direction.

Y motor 26 is a power unit for shifting contact 20 in the Y direction. Y motor 26 rotates drive shaft 27.

Drive shaft 27 transmits power of Y motor 26 to Y belt 25 on the opposite side.

In tray shifting mechanism 6, the belts and rails may be replaced with worm gears. Further, although contact 20, X rail 21 and others shift over tray 2 in tray shifting mechanism 6 in FIGS. 1 and 4, they may also shift under tray 2.

Media inject/eject belt 7 injects and ejects media 1 between tray 2 and drive 4 through rotating operation of the belt. Media inject/eject belt 7 is arranged in front of drives 4.

Reader 8 reads identifying means (not shown, e.g., a wireless chip or a bar-code) attached to media 1. Reader 8 is attached to door 9. Reader 8 reads an identifier of media 1 stored in the identifying means when media 1 is inserted to library device 10.

Door 9 is attached to the front of library device 10. Door 9 is used when media 1 is inserted, for example.

Next, operation according to the first exemplary embodiment will be described. Basic functions and operation of drive 4, which are well known to those skilled in the art, will not be described herein.

First, "insert operation of media 1 to library device 10", will be described. Next, a "shift method of tray 2" being a shift method of tray 2 on which media 1 is mounted in library device 10 will be described. Then, "inject/eject operation of media 1 to/from drive 4" to inject media 1 to drive 4 after media 1 is positioned in front of drive 4 in library device 10 will be described.

The "insert operation of media 1 to library device 10" will be described with reference to FIGS. 1, 2 and 3. In order to insert media 1 to library device 10, door 9 is opened and media 1 is mounted on front-most tray 2 in library device 10. When door 9 is closed, reader 8 reads out an identifier of identifying means attached to media 1. Then, the read out identifier of media 1 (for example, "MJ (Media J)" in FIG. 3) is stored in media position table 51 in control unit 5.

Next, the "shift method of tray 2" being a shift method of tray 2 on which media 1 is mounted will be described. First, a basic shift method of tray 2 will be described with reference to FIGS. 1 and 2.

When an operator or a host device (not shown) instructs library device 10 to inject media 1 into drive 4, control unit 5 shifts tray 2 storing designated media 1 (hereinafter, referred to as target tray 2) to the front of designated drive 4 (hereinafter, referred to as a destination position).

Trays 2 are arranged in a matrix (length)×(width), as described above. Since no tray 2 is arranged on one position on a matrix, the matrix includes a space corresponding to one tray 2. Control unit 5 chooses tray 2 to be shifted according to a "shift algorithm of tray 2 in a matrix" describe later and slides the tray 2 in a direction toward the space. The sliding of tray 2 produces a new space. Control unit 5 shifts target tray 2 in a destination position by repeating the choice of tray 2 to be shifted and sliding the tray 2 in a direction toward the space.

Next, the "shift method of tray 2" will be described in more detail. First, "update operation of media position table 51 (in control unit 5)" that is performed in control unit 5 when tray 2 to be shifted slides will be described. Next, "operation of tray shifting mechanism 6" for contact 20 to slide tray 2 to be shifted will be described. Then, a "shift algorithm of tray 2 in a matrix" to shift target tray 2 to a destination position will be described.

The "update operation of media position table 51 (in control unit 5)" that is performed in control unit 5 when tray 2 to be shifted slides will be described with reference to FIGS. 3, 5 to 9. FIGS. 5 to 8 are exemplary flowcharts showing update operation of media position table 51 according to the first exemplary embodiment.

Figure 5:
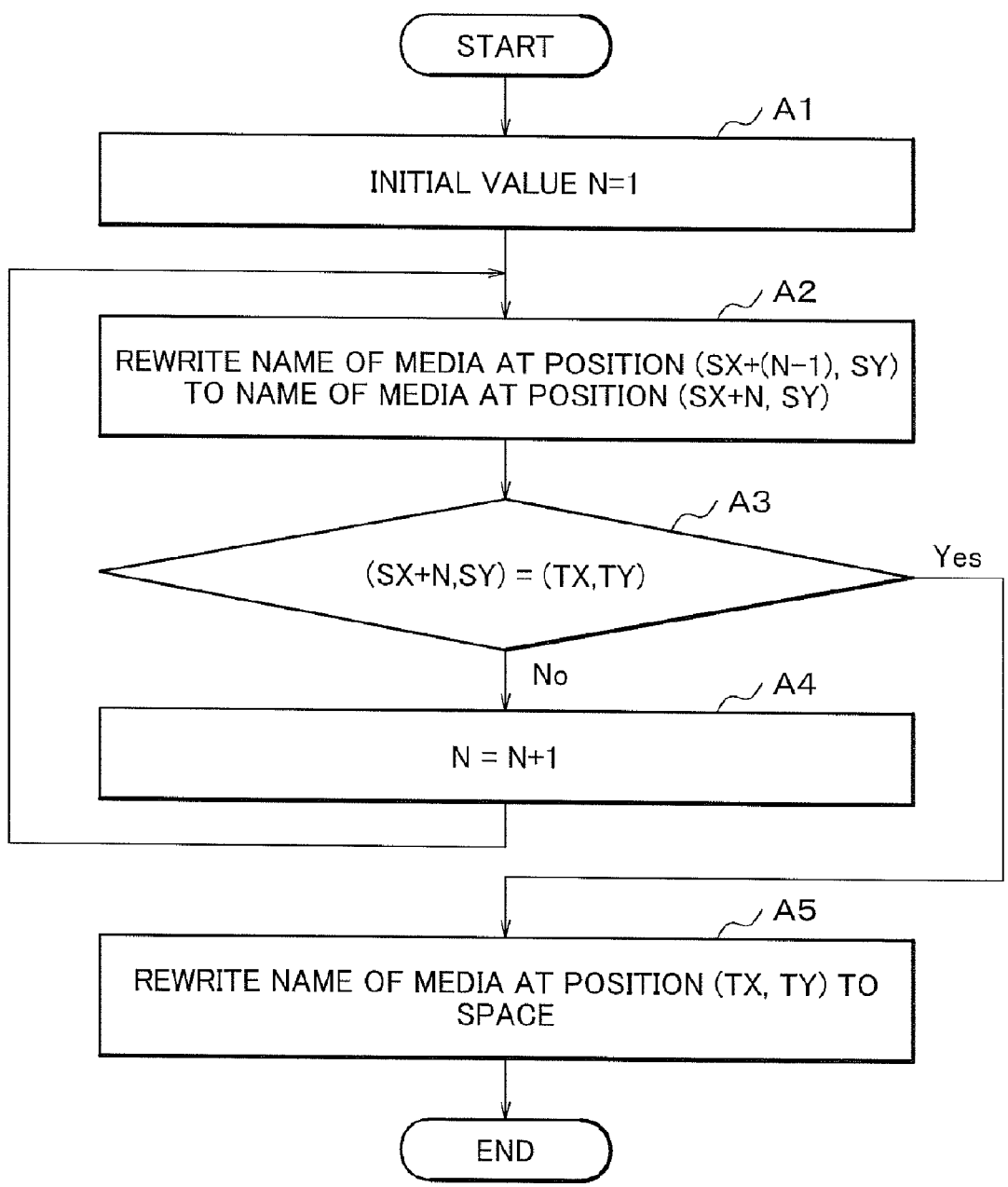
FIG. 5 is an exemplary flowchart showing an update operation (leftward shift) of media position table 51 according to the first exemplary embodiment.
Figure 6:
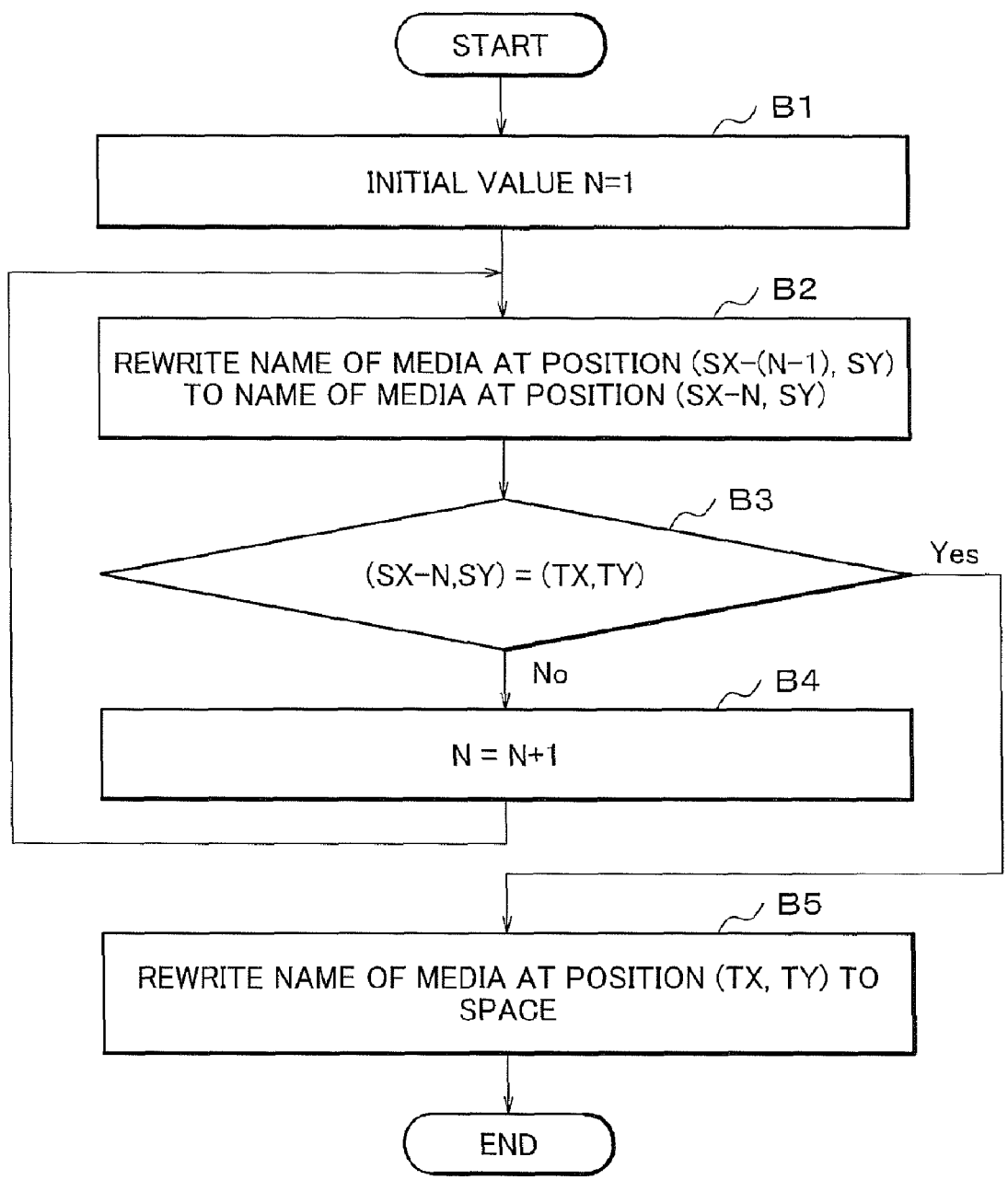
FIG. 6 is an exemplary flowchart showing an update operation (rightward shift) of media position table 51 according to the first exemplary embodiment.
Figure 7:
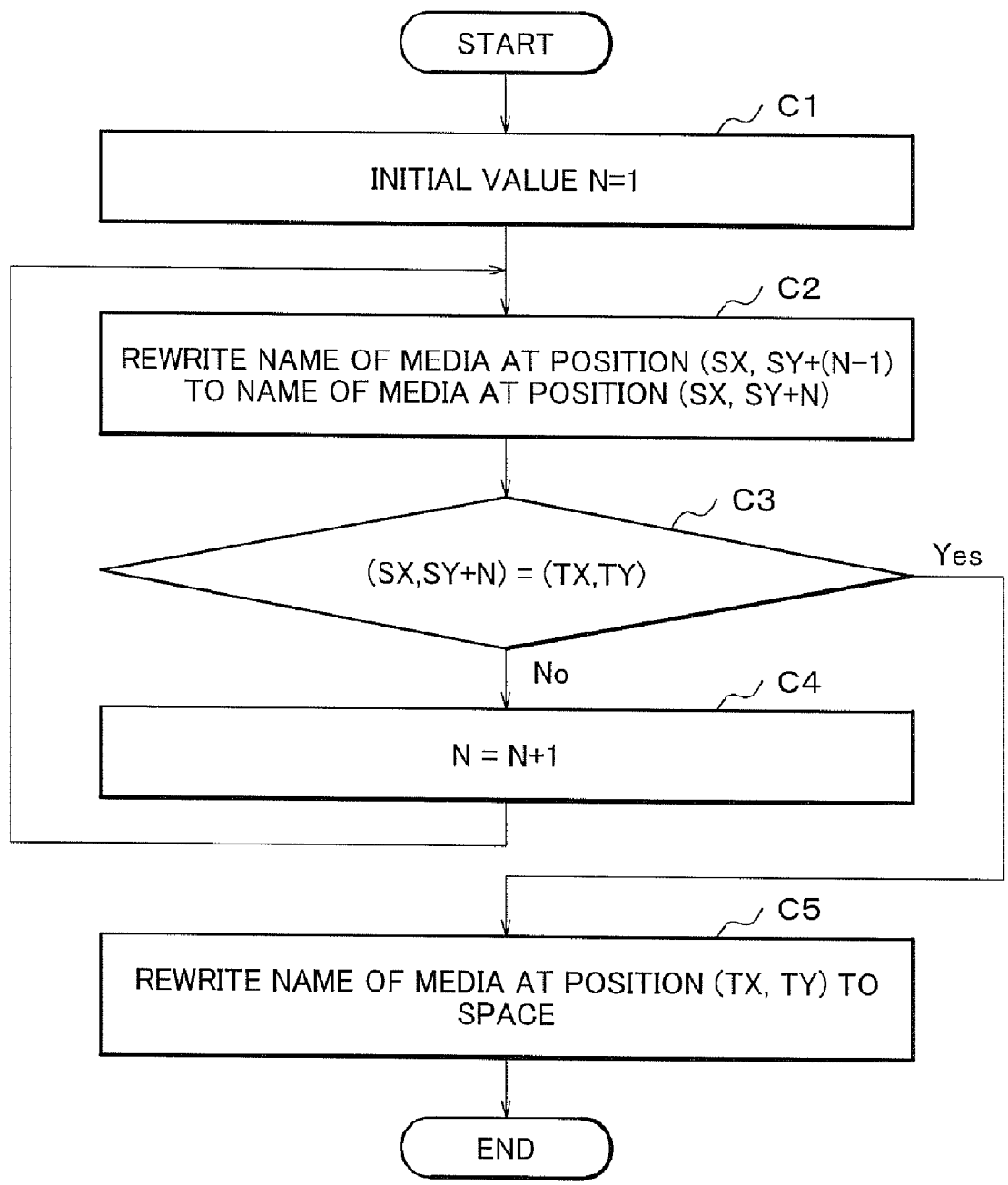
FIG. 7 is an exemplary flowchart showing an update operation (upward shift) of media position table 51 according to the first exemplary embodiment.
Figure 8:
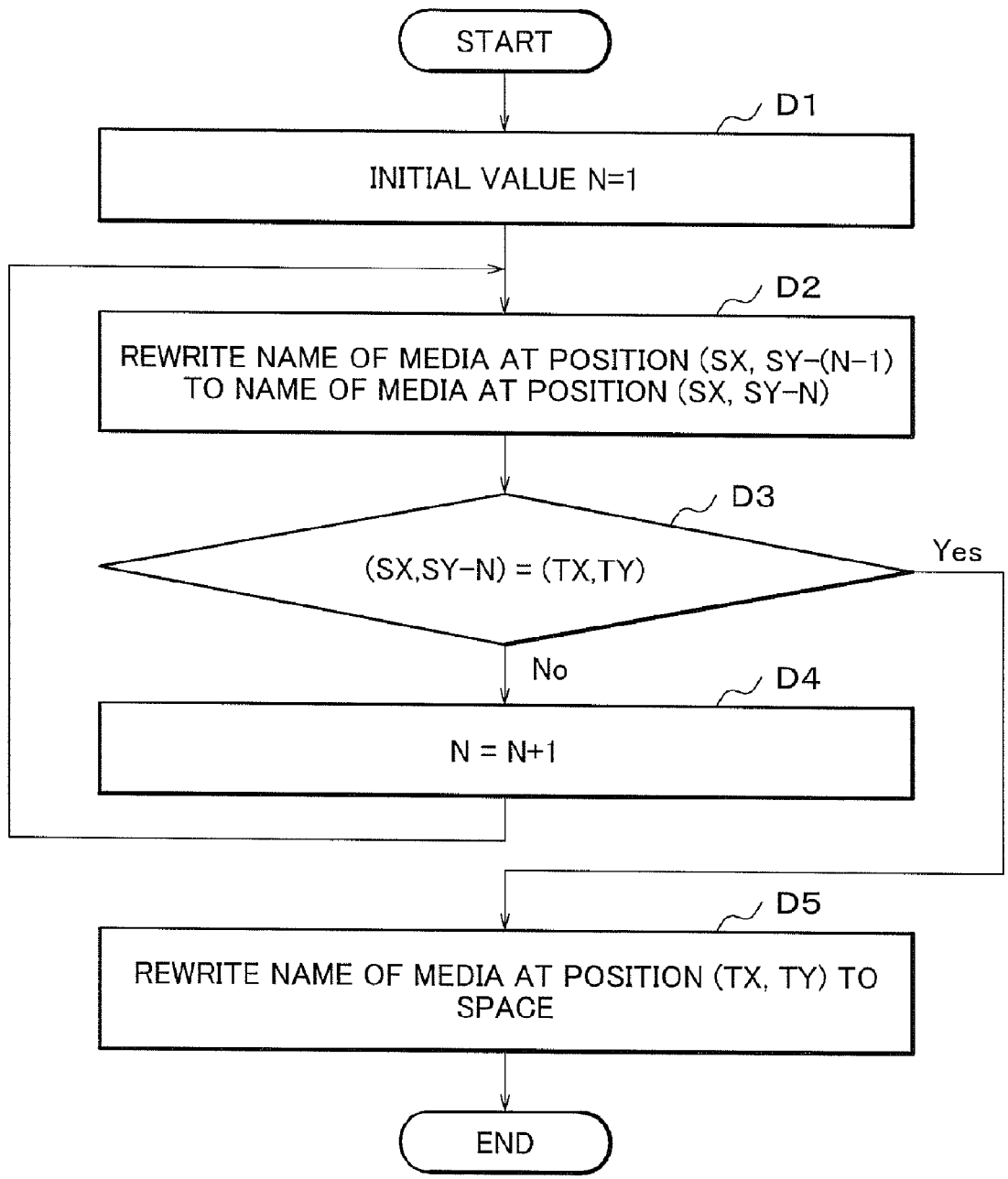
FIG. 8 is an exemplary flowchart showing an update operation (downward shift) of media position table 51 according to the first exemplary embodiment.

The update operation of media position table 51 when tray 2 is shifted leftwards will be described with reference to FIG. 5.

First, a position of tray 2 to be shifted is defined as (TX, TY) and a position of a Space before being shifted is defined as (SX, SY).

Tray control unit 52 sets an initial value N=1 (step A1). Then, tray control unit 52 rewrites a name of media 1 at position (SX+(N−1), SY) to a name of media 1 at position (SX+N, SY) (step A2). Then, if (SX+N, SY)=(TX, TY) (Yes at step A3), tray control unit 52 rewrites a name of media 1 at position (TX, TY) to a Space (step A5) and ends the processing. If (SX+N, SY)=(TX, TY) does not hold (No at step A3), tray control unit 52 changes a value of N to N=N+1 (step A4) and again proceeds to the processing at step A2.

Update operation of media position table 51 in the case of shift in other directions, i.e., rightward shift (FIG. 6), upward shift (FIG. 7) and downward shift (FIG. 8) is similar to the above.

Figure 9:
FIG. 9 is an exemplary drawing showing update of media position table 51 when tray 2 is shifted leftwards in the first exemplary embodiment.

Next, a specific example will be illustrated with reference to FIG. 9. FIG. 9 is an exemplary drawing showing update of media position table 51 when tray 2 is shifted leftwards in the first exemplary embodiment. In an example in FIG. 9, if trays 2 are arranged according to media position table 51 in FIG. 3, trays 2 on which MJ and MK are mounted are shifted in the leftward direction (direction toward a Space). A position of the Space before being shifted is (SX, SY)=(1, 4), while a position of tray 2 to be shifted is (TX, TY)=(3, 4). Tray control unit 52 shifts trays 2 leftwards on which MJ and MK are mounted by pushing tray 2 leftwards on which MK is mounted through contact 20. After the shift, tray control unit 52 updates media position table 51 as described below.

Tray control unit 52 sets an initial value N=1 (step A1). Then, tray control unit 52 rewrites a name of media 1 at position (SX+(N−1), SY)=(SX, SY)=(1, 4), i.e. a position of the Space to a name of media 1 at position (SX+N, SY)=(SX+1, SY)=(2, 4), i.e., MJ (step A2). Then, since (SX+N, SY)=(2, 4) is a different value from (TX, TY)=(3, 4) (No at step A3), tray control unit 52 changes a value of N to N=2 (step A4) and again proceeds to the processing at step A2.

Then, tray control unit 52 rewrites a name of media 1 at position (SX+(N−1), SY)=(SX+1, SY)=(2, 4) to a name of media 1 at position (SX+N, SY)=(SX+2, SY)=(3, 4), i.e. MK (step A2). Then, since (SX+N, SY)=(3, 4) is the same value as (TX, TY)=(3, 4) (Yes at step A3), tray control unit 52 rewrites a name of media 1 at position (TX, TY)=(3, 4) to Space (step A5) and ends the processing.

Next, the "operation of tray shifting mechanism 6" for contact 20 to slide tray 2 to be shifted will be described. First, basic operation of tray shifting mechanism 6 will be described with reference to FIGS. 1 and 2.

Control unit 5 controls to drive X motor 23 and Y motor 26 of tray shifting mechanism 6 and shift contact 20 in the X and Y directions. By the above control, control unit 5 shifts contact 20 so as to avoid each tray-top projection 205 of tray 2 and positions the contact 20 beside tray-top projection 205 of tray 2 to be shifted. When the positioning is completed, control unit 5 shifts tray 2 to be shifted by shifting contact 20 in a direction toward a space.

Figure 11:
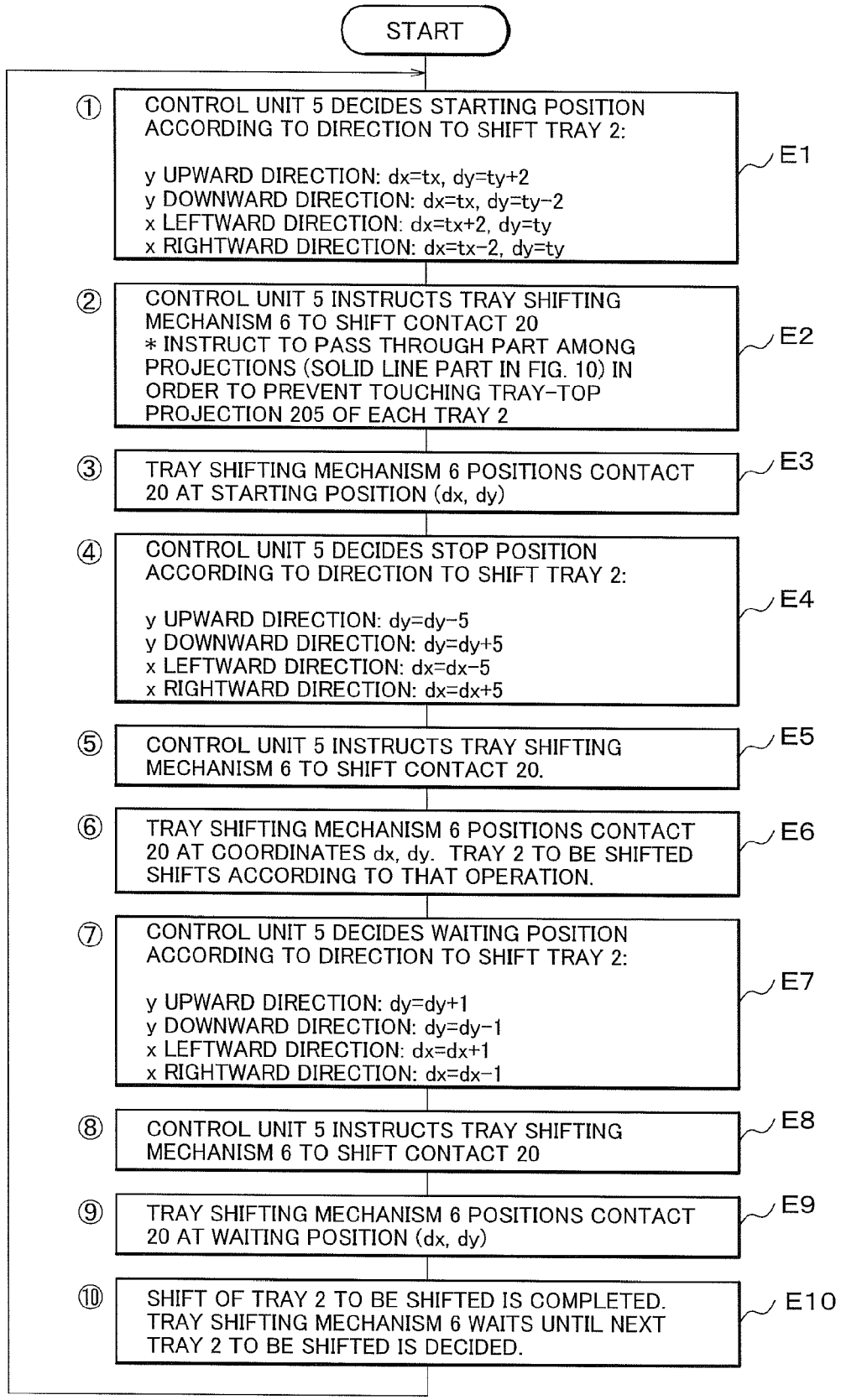
FIG. 11 is an exemplary flowchart showing shift control of contact 20 according to the first exemplary embodiment.
Figure 12:
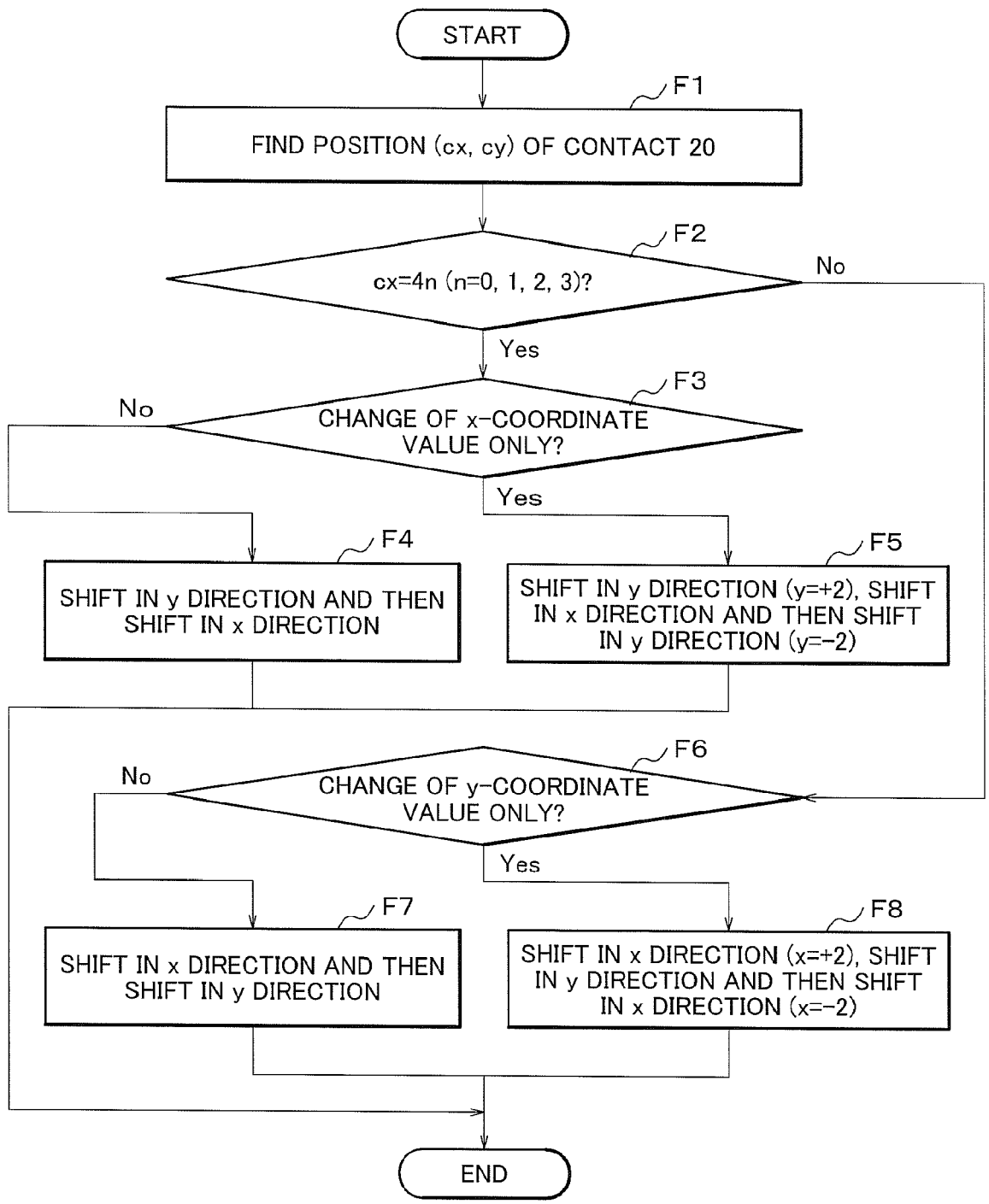
FIG. 12 is an exemplary flowchart showing details of step E2 in the flowchart in FIG. 11 in the first exemplary embodiment.

Next, detailed operation of tray shifting mechanism 6 will be described with reference to FIGS. 10, 11 and 12. FIG. 10 is an exemplary drawing showing a positional relation (positional relation on x-y coordinates) between contact 20 and tray-top projection 205 of tray 2 in the first exemplary embodiment. FIG. 11 is an exemplary flowchart showing shift control of contact 20 according to the first exemplary embodiment. FIG. 12 is an exemplary flowchart showing details of step E2 in the flowchart in FIG. 11 in the first exemplary embodiment.

The description proceeds on the following assumption. Choice of tray 2 to be shifted and a shift direction of tray 2 to be shifted are decided according to a "shift algorithm of tray 2 on a matrix (see FIGS. 14A-B)" described later. If a position of tray-top projection 205 of tray 2 to be shifted is (tx, ty) and a position of the center of a space is (sx, sy), then tray 2 at a position tx=sx or ty=sy can be a shift target. For example, in FIG. 10, trays 2 A, D and G on tx=2 and trays 2J and K on ty=14 can be shift targets. In FIG. 10, before tray 2 to be shifted is shifted, a position where contact 20 is to be positioned is set as a starting position. A starting position is a position (on a solid line in FIG. 10) shifted by two from a position (tx, ty) of tray 2 to be shifted before shift in the opposite direction to a shift direction. For example, in FIG. 10, a starting position is (x, y)=(2, 0) where contact 20 is positioned before tray 2 A is shifted from (tx, ty)=(2, 2) in a direction toward a space (sx, sy)=(2, 14).

In FIG. 10, in order to position tray 2 to be shifted at a shift destination, a position where contact 20 is positioned is set as a stop position. A stop position is a position shifted by one in the opposite direction to a shift direction from a position (tx, ty) of tray-top projection 205 after tray 2 to be shifted is shifted. A stop position is also a position shifted by five from a starting position in a shift direction. For example, in FIG. 10, when tray 2 A is shifted from (2, 2) to (2, 6), a stop position where contact 20 is positioned is (x, y)=(2, 5).

After tray 2 to be shifted is shifted and until next tray 2 to be shifted is chosen, a position where contact 20 is positioned is set as a waiting position. A waiting position is a position shifted by two (on a solid line in FIG. 10) in the opposite direction to a shift direction from a position (tx, ty) of tray 2 to be shifted after shift. For example, in FIG. 10, after tray 2 J is shifted from (tx, ty)=(2, 14) to (tx, ty)=(6, 14), a waiting position is (x, y)=(4, 14) where contact 20 is positioned.

Next, shift control of contact 20 will be described with reference to FIG. 11. First, control unit 5 shifts contact 20 from a waiting position to a starting position of tray 2 to be shifted. That is, control unit 5 decides a starting position as (dx, dy) according in a direction to shift tray 2. Control unit 5 decides a value of the starting position as: dx=tx and dy=ty+2 if a shift direction is the y upward direction; dx=tx and dy=ty−2 if the shift direction is the y downward direction; dx=tx+2 and dy=ty if the shift direction is the x leftward direction; and dx=tx−2 and dy=ty if the shift direction is the x rightward direction (step E1). Next, control unit 5 instructs tray shifting mechanism 6 to shift contact 20 from the waiting position to the starting position (dx, dy). At that time, control unit 5 instructs contact 20 to pass through parts between tray-top projections 205 (a solid line part in FIG. 10) to prevent contact 20 from touching tray-top projection 205 of each tray 2 (step E2). Next, tray shifting mechanism 6 positions contact 20 at the starting position (dx, dy) (step E3).

Next, control unit 5 shifts tray 2 through contact 20. That is, control unit 5 decides a stop position as (dx, dy) depending on a shift direction of tray 2. Control unit 5 decides a value of the stop position as: dy=dy−5 if the shift direction is the y upward direction; dy=dy+5 if the shift direction is the y downward direction; dx=dx−5 if the shift direction is the x leftward direction; and dx=dx+5 if the shift direction is the x rightward direction (step E4). Control unit 5 instructs tray shifting mechanism 6 to shift contact 20 to the stop position (dx, dy) (step E5). Tray shifting mechanism 6 positions contact 20 at the stop position (dx, dy). This operation cause shift of tray 2 to be shifted (step E6).

Next, control unit 5 shifts contact 20 to a waiting position of tray 2 to be shifted. That is, control unit 5 decides a waiting position as (dx, dy) according in a direction in which tray 2 has been shifted. Control unit 5 decides a value of the waiting position as: dy=dy+1 if the shift direction is the y upward direction; dy=dy−1 if the shift direction is the y downward direction; dx=dx+1 if the shift direction is the x leftward direction; and dx=dx−1 if the shift direction is the x rightward direction (step E7). Control unit 5 instructs tray shifting mechanism 6 to shift contact 20 to a waiting position (dx, dy) (step E8). Tray shifting mechanism 6 positions contact 20 at the waiting position (dx, dy) (step E9). By this operation, shift of tray 2 to be shifted is completed. Tray shifting mechanism 6 waits at the waiting position until next tray 2 to be shifted is decided (step E10).

Next, details of step E2 in the flowchart in FIG. 11 (shift of contact 20 from the waiting position to the starting position) will be described with reference to FIGS. 10 and 12.

In FIG. 10, a waiting position is on a solid line surrounding a space. Either one of a value of an x-coordinate or a value of a y-coordinate of the waiting position is the same as the center position of the space (sx, sy). A starting position is also on a solid line. Either one of a value of an x-coordinate or a value of a y-coordinate of the starting position is the same as the center position of the space (sx, sy). Based on that, shift of contact 20 from the waiting position to the starting position is one of "change a value of an x-coordinate only while keeping a value of a y-coordinate to be sy", "change a value of a y-coordinate only while keeping a value of an x-coordinate to be sx", "change value sy of a y-coordinate and change a value of an x-coordinate to sx" and "change value sx of an x-coordinate and change a value of a y-coordinate to sy".

Among the above, in the case of "change a value of an x-coordinate only while keeping a value of a y-coordinate to be sy" in FIG. 10, if contact 20 shifts only in the x direction, it collides with tray-top projection 205. In order to prevent the collision, contact 20 shifts by +2 in the y direction, shifts to the same position as a value of an x-coordinate of the starting position in the x direction, and shift to sy by −2 in the y direction on a solid line. For example, if a waiting position is (x, y)=(4, 14) and a starting position is (x, y)=(8, 14), contact 20 first shifts in the y direction (y=+2) ((x, y)=(4, 16)), shifts in the x direction ((x, y)=(8, 16)), and then, shifts in the y direction (y=−2) ((x, y)=(8, 14)). By the above shift, contact 20 can shift from the waiting position to the starting position without colliding with tray-top projection 205 of tray 2 J.

Similarly, in the case of "change a value of a y-coordinate only while keeping a value of an x-coordinate to be sx" in FIG. 10, contact 20 shifts by +2 in the x direction, shifts to the same position as a value of a y-coordinate of the starting position in the y direction, and shifts to sx by −2 in the x direction on a solid line.

Meanwhile, in the case of "change value sy of a y-coordinate and change a value of an x-coordinate to sx" in FIG. 10, contact 20 shifts to the same position as a value of a y-coordinate of the starting position in the y direction, and shifts to sx in the x direction on a solid line. For example, if a waiting position is (x, y)=(4, 14) and a starting position is (x, y)=(2, 0), contact 20 first shifts in the y direction ((x, y)=(4, 0)), and then, shifts in the x direction ((x, y)=(2, 0)). By this shift, contact 20 can shift from the waiting position to the starting position without colliding with tray-top projections 205 of trays 2 G, D and A.

Similarly, in the case of "change value sx of an x-coordinate and change a value of a y-coordinate to sy" in FIG. 10, contact 20 shifts to the same position as a value of an x-coordinate of the starting position in the x direction, and shifts to sy in the y direction on a solid line.

In FIG. 12, first, control unit 5 finds a current position of contact 20 (a waiting position) (cx, cy) (step F1). Specifically, tray control unit 52 reads out a position of contact 20 (cx, cy) from contact position storing unit 53. A position of contact 20 is stored in contact position storing unit 53 each time contact 20 shifts. Next, if cx=4n (n=0, 1, 2, 3) (a value of a y-coordinate is the same as sy) (Yes at step F2), control unit 5 determines whether or not to change a value of an x-coordinate only (step F3). If only a value of an x-coordinate is to be changed ("change a value of an x-coordinate only while keeping a value of a y-coordinate to be sy") (Yes at step F3), control unit 5 instructs to shift contact 20 first in the y direction (y=+2), then in the x direction, and then in the y direction (y=−2) (step F5). If not only a value of an x-coordinate is to be changed ("change value sy of a y coordinate and change a value of an x-coordinate to sx") (No at step F3), control unit 5 instructs to shift contact 20 first in the y direction, and then in the x direction (step F4).

Unless cx=4n (n=0, 1, 2, 3) (if a value of an x-coordinate is the same as sx) (No at step F2), control unit 5 determines whether or not to change only a value of a y-coordinate (step F6). If a value of a y-coordinate is only to be changed ("change a value of a y-coordinate only while keeping a value of an x-coordinate to be sx") (Yes at step F6), control unit 5 instructs to shift contact 20 first in the x direction (x=+2), then in the y direction, and then in the x direction (x=−2) (step F8). If not only a value of a y-coordinate is to be changed ("change value sx of an x-coordinate and change a value of a y-coordinate to sy") (No at step F6), control unit 5 instructs to shift contact 20 first in the x direction, and then in the y direction (step F7).

Next, a specific example of detailed operation of tray shifting mechanism 6 will be described with reference to FIGS. 10, 11 and 12. In this example, tray 2 D at tx=2, ty=6 in FIG. 10 is to be shifted, i.e., shifted in the Y downward direction. A current position of contact 20 (a waiting position) is (cx, cy)=(4, 14).

First, control unit 5 decides a starting position depending on a shift direction (the Y downward direction) as (dx, dy)=(2, 4) (step E1). Control unit 5 instructs tray shifting mechanism 6 to position contact 20 at the starting position (dx, dy)=(2, 4). Since the shift of contact 20 from a current position (waiting position) to a (starting position) corresponds to "change value sy of a y-coordinate and change a value of an x-coordinate to sx", control unit 5 instructs shift of contact 20 for two times as follows. That is, control unit 5 instructs tray shifting mechanism 6 to shift contact 20 from (x, y)=(4, 14) to (x, y)=(4, 4). Then, control unit 5 instructs tray shifting mechanism 6 to shift contact 20 from (x, y)=(4, 4) to the starting position (x, y)=(2, 4) (step E2). Tray shifting mechanism 6 shifts contact 20 to the starting position (dx, dy)=(2, 4) according to the instruction from control unit 5. When the shift is completed, tray shifting mechanism 6 reports the shift completion to control unit 5 (step E3).

Control unit 5 decides a stop position to shift tray 2D depending on a shift direction (Y downward direction) as (dx, dy)=(2, 9) (step E4). Control unit 5 instructs tray shifting mechanism 6 to position contact 20 at the stop position (dx, dy)=(2, 9) (step E5). Tray shifting mechanism 6 shifts contact 20 to the stop position (dx, dy)=(2, 9) according to the instruction from control unit 5. By this operation, trays 2 D and G shift by one tray (by one element of a matrix) in the Y downward direction. When the shift is completed, tray shifting mechanism 6 reports the shift completion to control unit 5 (step E6).

Control unit 5 decides a waiting position depending on a shift direction (Y downward direction) as (dx, dy)=(2, 8) (step E7). Control unit 5 instructs tray shifting mechanism 6 to position contact 20 at the waiting position (dx, dy)=(2, 8)

(step E8). Tray shifting mechanism 6 shifts contact 20 to the waiting position (dx, dy)=(2, 8) according to the instruction from control unit 5 (step E9). By the above shift, shift operation of tray 2 D is completed. Tray shifting mechanism 6 waits until next tray 2 to be shifted is decided according to the "shift algorithm of tray 2 in a matrix" (step E10).

Figure 13:
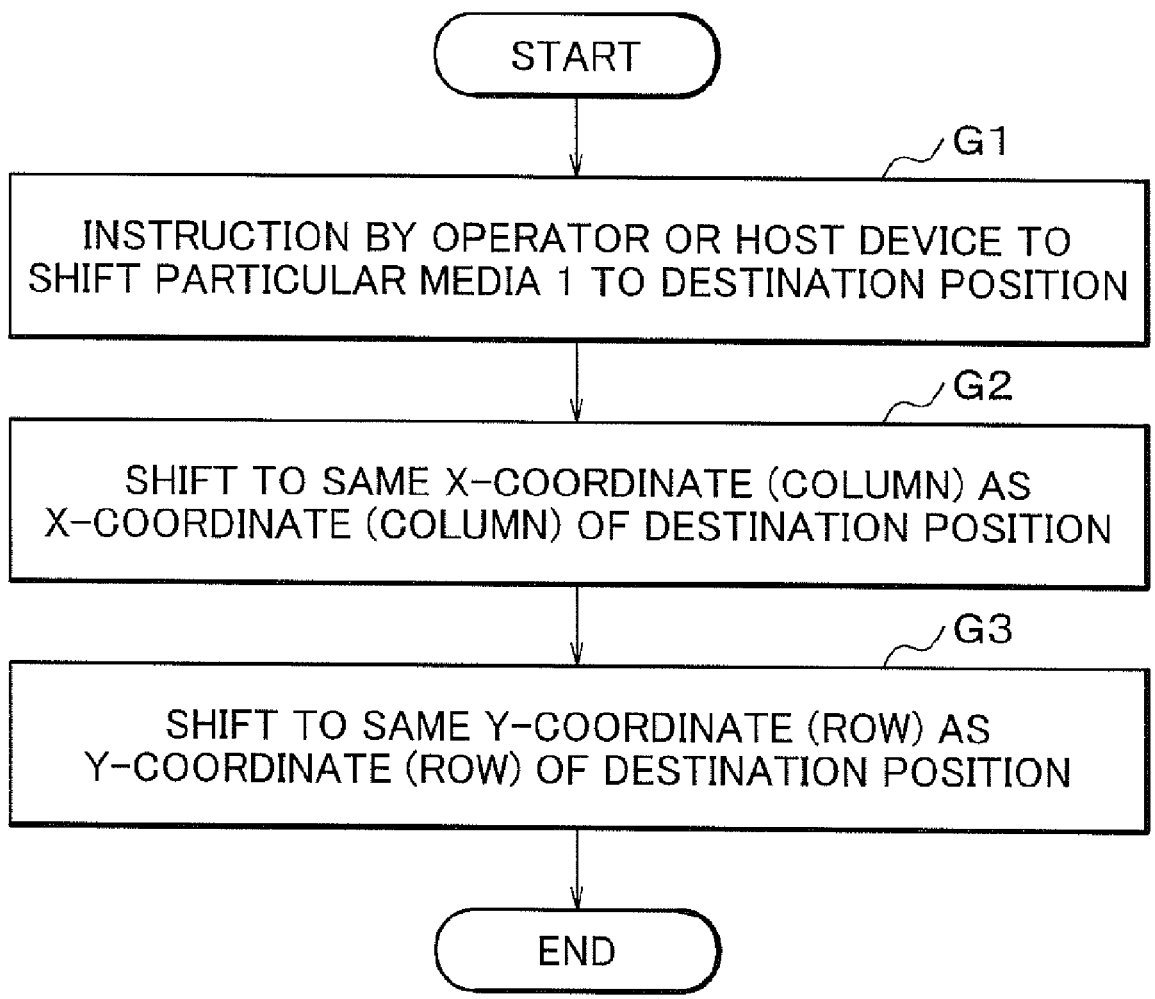
FIG. 13 is an exemplary flowchart showing an overall operation by a shifting unit to shift target tray 2 to a destination position in the first exemplary embodiment.

Next, the "shift algorithm of tray 2 in a matrix", which is an algorithm to shift target tray 2 to a destination position, will be described with reference to FIGS. 13, 14A-B and 15A-D. That is, operation to shift target tray 2 to a destination position will be described based on the basic operation of tray shifting mechanism 6 described previously. FIG. 13 is an exemplary flowchart showing an overall operation by a shifting unit to shift target tray 2 to a destination position in the first exemplary embodiment.

First, library device 10 receives an instruction to shift particular media 1 to a destination position from an operator or a host device (step G1). Herein, for example, library device 10 receives an instruction to inject particular media 1 into drive 4. A shifting unit including control unit 5 and tray shifting mechanism 6 shifts tray 2 (target tray 2) for storing particular designated media 1 to a position (column) with the same X-coordinate value as an X-coordinate (column) of a destination position. That is, the shifting unit shifts target tray 2 to the same column as the column of the destination position (step G2). Then, the shifting unit shifts target tray 2 to a position (row) with the same Y-coordinate value as a Y-coordinate (row) of the destination position. That is, the shifting unit shifts target tray 2 to the same row as the row of the destination position (step G3).

Next, detailed operation of a tray shifting unit to shift target tray 2 to a destination position will be described.

First, library device 10 receives an identifier of particular media 1 and an identifier of drive 4 being a shift destination of the media 1 from an operator or a host device. Tray control unit 52 checks a position of particular media 1 with reference to media position table 51. The position is a position of target tray 2 to be shifted. Because of this, tray control unit 52 stores the position as a target position in target position storing unit 54. Tray control unit 52 determines a destination position based on drive 4 being a shift destination (for example, in the case of drive 4A, (X, Y)=(1, 1)), and stores the position as a destination position in destination position storing unit 55. Afterward, each time tray control unit 52 shifts tray 2 as described later and shown in FIGS. 14A-B, it updates information of media position table 51. Then, tray control unit 52 updates information of target position storing unit 54 based on the information.

FIGS. 14A-B are exemplary tables showing a detailed operation by the shifting unit (tray shifting mechanism 6 and control unit 5) to shift target tray 2 to a destination position in the first exemplary embodiment. Step G2 shown previously in FIG. 13 corresponds to "shift to the same X-coordinate (column) as an X-coordinate (column) of a destination position" in FIG. 14A, while step G3 in FIG. 13 corresponds to "shift to the same Y-coordinate (row) as a Y-coordinate (row) of a destination position" in FIG. 14B.

Tray control unit 52 determines whether or not each condition is satisfied from top to bottom (in the order of (X1), (X2), (X3) in the item "X shift", in the order of (leftward 1), (leftward 2), (leftward 3), (leftward 4) in the item "leftward shift"), in the order of (rightward 1), (rightward 2), (rightward 3), (rightward 4) in the item "rightward shift") in FIG. 14A.

Similarly, tray control unit 52 determines whether or not each condition is satisfied from top to bottom (in the order of (Y1), (Y2), (Y3) in the item "Y shift", in the order of (upward 1), (upward 2), (upward 3), (upward 4) in the item "upward shift"), in the order of (downward 1), (downward 2), (downward 3), (downward 4) in the item "downward shift") in FIG. 14B.

In FIGS. 14A-B, a "target" indicates tray 2 for storing particular media 1 that an operator or a host device has instructed library device 10 to shift to a destination position. A "destination position" indicates a destination position determined by tray control unit 52 corresponding to a shift destination. Directions "leftward", "rightward", "upward" and "downward" indicate an X minus direction, an X plus direction, a Y minus direction and a Y plus direction, respectively. As such, for example, if "tray 2 with the next upper Y-coordinate to a target and the same X-coordinate as a space" is chosen, tray control unit 52 operates as follows. That is, tray control unit 52 reads out a position of the target and a position of the space from target position storing unit 54 and space position storing unit 56. Afterward, tray control unit 52 chooses tray 2 at position (X, Y)=(X-coordinate of space, Y-coordinate value of target−1) ("next upper Y-coordinate" means a Y-coordinate value smaller by one, as in the above described definition).

The shifting unit starts from item "X shift" in "shift to the same X-coordinate (column) as an X-coordinate (column) of a destination position" shown in FIG. 14A. In item "X shift", the shifting unit proceeds to: item "Y shift" if X-coordinates of a target and a destination position are same (X1); item "rightward shift" if an X-coordinate of the target is at the left side of the destination position (X2); and item "leftward shift" if an X-coordinate of the target is at the right side of the destination position (X3).

In item "leftward shift", the shifting unit proceeds to: item "X shift" after shifting target tray 2 leftwards if Y-coordinates of the space and the target are same and the space is at the left side of the target (leftward 1); item "X shift" after shifting tray 2 with the same Y-coordinate as the target and the same X-coordinate as the space in a direction toward the space (upward or downward) if an X-coordinate of the space is at the left side of the target (leftward 2); item "X shift" after shifting tray 2 with the same Y-coordinate as the space and an X-coordinate next (left) to the target in a direction toward the space (rightward) if Y-coordinates of the space and the target are not same (leftward 3); and item "X shift" after shifting tray 2 with a Y-coordinate next (upper or lower) to the target and the same X-coordinate as the space in a direction toward the space (upward or downward) in the case other than the above (leftward 4).

In item "rightward shift", the shifting unit proceeds to: item "X shift" after shifting target tray 2 in the rightward direction if Y-coordinates of the space and the target are same and the space is at the right side of the target (rightward 1); item "X shift" after shifting tray 2 with the same Y-coordinate as the target and the same X-coordinate as the space in a direction toward the space (upward or downward) if an X-coordinate of the space is at the right side of the target (rightward 2); item "X shift" after shifting tray 2 with the same Y-coordinate as the space and an X-coordinate next (right) to the target in a direction toward the space (leftward) if Y-coordinates of the space and the target are not same (rightward 3); and item "X shift" after shifting tray 2 with a Y-coordinate next (upper or lower) to the target and the same X-coordinate as the space in a direction toward the space (upward or downward) in the case other than the above (rightward 4).

In item "Y shift" in item "shift to the same Y-coordinate (row) as a Y-coordinate (row) of a destination position", the shifting unit proceeds to: "shift completed" if Y-coordinates of the target and the destination positions are same (Y1); item "downward shift" if a Y-coordinate of the target is the at the upper side of the destination position (Y2); and item "upward shift" if a Y-coordinate of the target is at the lower side of the destination position (Y3).

In item "upward shift", the shifting unit proceeds to: item "Y shift" after shifting target tray 2 upwards if X-coordinates of the space and the target are same and the space is at the upper side of the target (upward 1); "Y shift" after shifting tray 2 with the same X-coordinate as the target and the same Y-coordinate as the space in a direction toward the space (rightwards or leftwards) if a Y-coordinate of the space is at the upper side of the target (upward 2); "Y shift" after shifting tray 2 with the same X-coordinate as the space and a Y-coordinate next to the target (upper) in a direction toward the space (downward) if X-coordinates of the space and the target are not same (upward 3); and "Y shift" after shifting tray 2 with an X-coordinate next (right or left) to the target and the same Y-coordinate as the space in a direction toward the space (rightward or leftward) in the case other than the above (upward 4).

In item "downward shift", the shifting unit proceeds to: item "Y shift" after shifting target tray 2 downwards if X-coordinates of the space and the target are same and the space is at the lower side of the target (downward 1); item "Y shift" after shifting tray 2 with the same X-coordinate as the target and the same Y-coordinate as the space in a direction toward the space (rightward or leftward) if a Y-coordinate of the space is at the lower side of the target (downward 2); item "Y shift" after shifting tray 2 with the same X-coordinate as the space and a Y-coordinate next (upper) to the target in a direction toward the space (upward) if X-coordinates of the space and the target are not same (downward 3); and item "Y shift" after shifting tray 2 with an X-coordinate next (right or left) to the target and the same Y-coordinate as the space in a direction toward the space (rightward or leftward) in the case other than the above (downward 4).

Next, a specific operation example of the shifting unit will be described with reference to FIGS. 15A-D. FIGS. 15A-D are exemplary drawings showing a specific operation example of the shifting unit according to the first exemplary embodiment At step I0 in FIG. 15A, the shifting unit shifts tray 2 "E" to the front of drive 4A. That is, at step I0 in FIG. 15A, a "target" in FIGS. 14A-B is tray 2 "E", while a "destination position" in FIGS. 14A-B is a position of tray 2 "A". The state at step I0 corresponds to the proceeding to item "leftward shift" if an X-coordinate of the target is at the right side of the destination position (X3) in item "X shift". The state at step I0 corresponds to the proceeding to item "X shift" after shifting tray 2 with the same Y-coordinate as the target and the same X-coordinate as the space in a direction toward the space (upward or downward) if an X-coordinate of the space is at the left side of the target (leftward 2) in item "leftward shift". As such, the shifting unit shifts tray 2 "D" with the same Y-coordinate as tray 2 "E" and the same X-coordinate as the space in a direction toward the space (downward), as shown at steps I1 and I2.

Next, the state at step I2 corresponds to the proceeding to item "leftward shift" if an X-coordinate of the target is at the right side of the destination position (X3) in item "X shift". The state at step I2 corresponds to the proceeding to item "X shift" after shifting target tray 2 leftwards if Y-coordinates of the space and the target are same and the space is at the left side of the target (leftward 1) in item "leftward shift". As such, the shifting unit shifts tray 2 "E" leftwards as shown at steps I3 and I4.

Next, the state at step I4 corresponds to the proceeding to item "Y shift" if X-coordinates of the target and the destination position are same (X1) in item "X shift". The state at step I4 corresponds to the proceeding to item "upward shift" if a Y-coordinate of the target is at the lower side of the destination position (Y3) in item "Y shift". The state at step I4 corresponds to the proceeding to "Y shift" after shifting tray 2 with the same X-coordinate as the space and a Y-coordinate next to the target (upper) in a direction toward the space (downward) if X-coordinates of the space and the target are not same (upward 3) in item "upward shift". As such, the shifting unit shifts tray 2 "B" with the same X-coordinate as the space and the next upper Y-coordinate to the target in a direction toward the space (downward), as shown at steps I5 and I6.

Next, the state at step I6 corresponds to the proceeding to item "upward shift" if a Y-coordinate of the target is at the lower side of the destination position (Y3) in item "Y shift". The state at step I6 corresponds to the proceeding to item "Y shift" after shifting tray 2 with the same X-coordinate as the target and the same Y-coordinate as the space in a direction toward the space (rightward or leftward) if a Y-coordinate of the space is at the upper side of the target (upward 2) in item "upward shift". As such, the shifting unit shifts tray 2 "A" with the same X-coordinate as tray 2 "E" and the same Y-coordinate as the space in a direction toward the space (rightward), as shown at steps I7 and I8.

Next, the state at step I8 corresponds to the proceeding to item "upward shift" if a Y-coordinate of the target is at the lower side of the destination position (Y3) in item "Y shift". The state at step I8 corresponds to the proceeding to item "Y shift" after shifting target tray 2 upwards if X-coordinates of the space and the target are same and the space is at the upper side of the target (upward 1) in item "upward shift". As such, the shifting unit shifts tray 2 "E" upwards as shown at steps I9 and I10.

Next, the state at step I10 corresponds to the proceeding to item "shift completed" if Y-coordinates of the target and the destination position are same (Y1) in item "Y shift". As such, the shifting unit determines "shift completed".

Referring to the state at step I4, the state at step I4 is equivalent to the case in that target tray 2 "E" (first carriage) being target tray 2 shifts to a position of tray 2 "A" (second carriage). The shifting unit shifts tray 2 "B" (third carriage) to a different position ((X, Y)=(2, 2)) from positions of trays 2 "E" and "A" (first and second carriages) (steps I5 and I6), and shifts tray 2 "A" (second carriage) to the position of tray 2 "B" (third carriage) before being shifted (step I7, 8).

The above operation allows shifting target tray 2 "E" (first carriage) to a destination position in the following case. That is, when tray 2 "E" (first carriage) shifts to a position of second tray 2, tray 2 "A" (second carriage) needs to shift. In this case, tray 2 "A" (second carriage) needs to shift to a position of tray 2 "B" (third carriage), hence tray 2 "B" (third carriage) can be a block. However, this exemplary embodiment can shift tray 2 "E" (first carriage) to a destination position in such a case.

According to this exemplary embodiment, as shown in FIG. 13, the shifting unit first operates to shift target tray 2 to a position (column) with the same X-coordinate value as an X-coordinate (column) of the destination position. However, the shifting unit may first operate to shift target tray 2 to a position (row) with the same Y-coordinate value as a Y-coordinate (row) of the destination position.

According to this exemplary embodiment, the shifting unit shifts target tray 2 to the destination position according to the procedure in FIG. 13. However, the shifting unit may set intermediate destination positions between target tray 2 and the destination position such that the shifting unit may repeatedly shift target tray 2 to an intermediate destination position and finally shifts target tray 2 to the destination position. In this case, the shifting unit replaces the destination positions at steps G2 and G3 in FIG. 13 with intermediate destination positions and repeats the procedures at steps G2 and G3 in FIG. 13.

That is, the shifting unit shifts target tray 2 to the destination position by repeatedly shifting target tray 2 to a position with the same X-coordinate (column) (or Y-coordinate (row)) value as an X-coordinate (column) (or Y-coordinate (row)) of an intermediate destination position, and then shifting target tray 2 to a position with the same Y-coordinate (row) (or X-coordinate (column)) value as a Y-coordinate (row) (or X-coordinate (column)) of the intermediate destination position. In this case, the shifting unit may also shift tray 2 to the destination position in zigzags depending on the circumstance between the position of target tray 2 and the destination position.

Figure 16A:
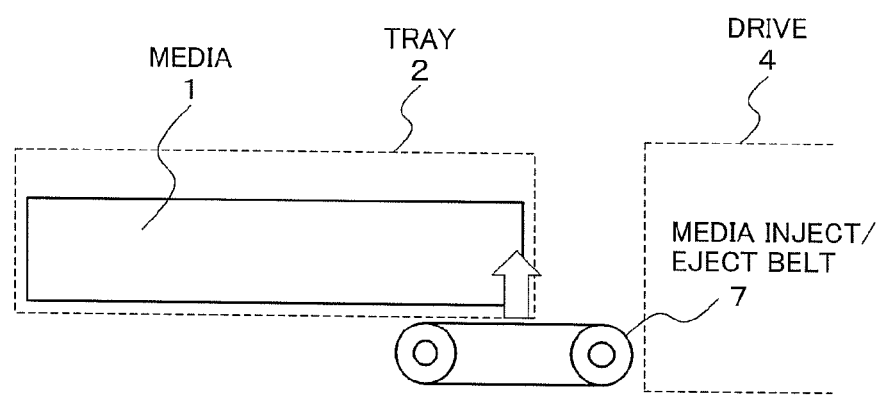
FIG. 16A is an exemplary side view showing configuration of a media inject/eject mechanism according to the first exemplary embodiment (lifting up media inject/eject belt 7)
Figure 16B:
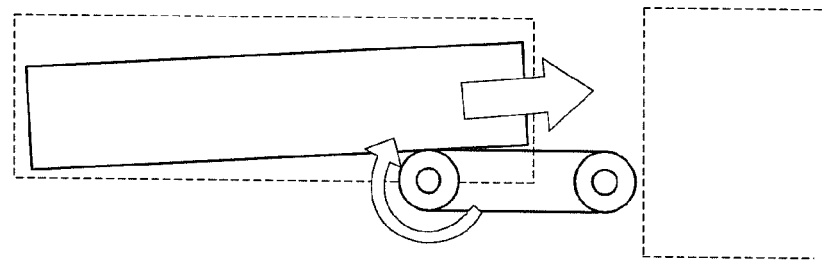
FIG. 16B is an exemplary side view showing configuration of the media inject/eject mechanism according to the first exemplary embodiment (delivering media 1)
Figure 16C:
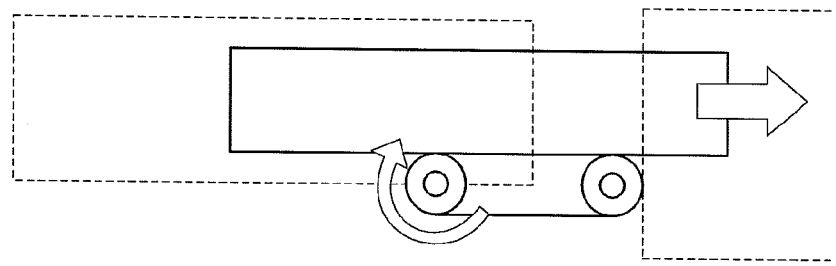
FIG. 16C is an exemplary side view showing configuration of the media inject/eject mechanism according to the first exemplary embodiment (injecting media 1 into drive 4)

Next, "inject and eject operation of media 1 to drive 4" after target tray 2 is shifted to a destination position will be described with reference to FIGS. 16A-C. FIGS. 16A-C are exemplary side views showing configuration of a media inject/eject mechanism according to the first exemplary embodiment.

Figure 21:
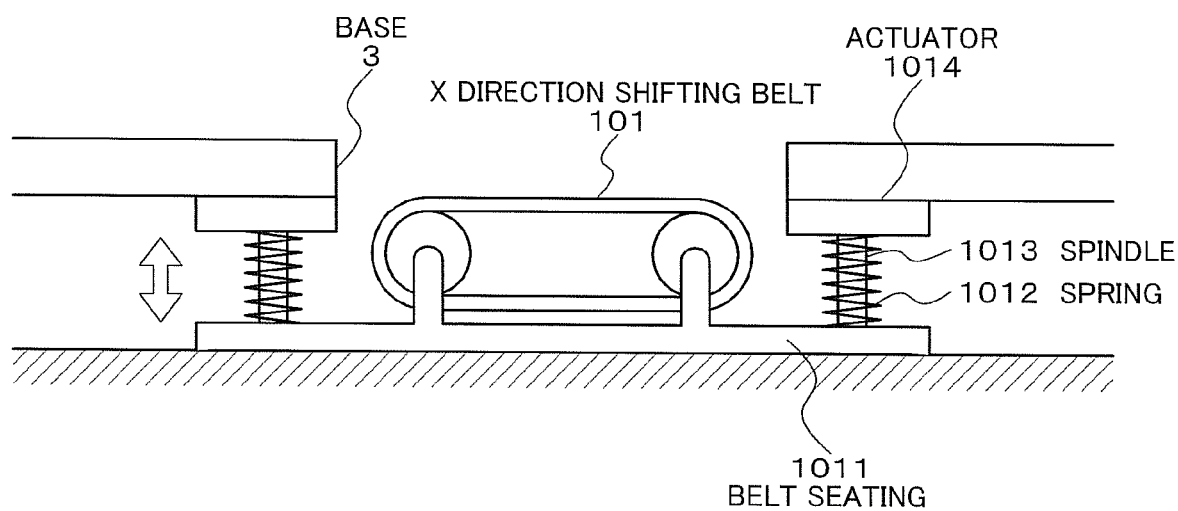
FIG. 21 is an exemplary drawing showing upward/downward shifting mechanism 1010 according to the fourth exemplary embodiment.

Media inject/eject belt 7 is fixed to base 3 movably upwards/downwards. Media inject/eject belt 7 shifts upwards to touch media 1 when media 1 is injected or ejected into/from drive 4. Then, media inject/eject belt 7 injects or ejects media 1 by friction. A mechanism to move media inject/eject belt 7 upwards/downwards is shown in FIG. 21 described later.

When tray 2 for storing media 1 is positioned in front of drive 4, control unit 5 drives media inject/eject belt 7 to inject media 1 into drive 4.

Specifically, control unit 5 first lifts up media inject/eject belt 7 to uplift media 1 in tray 2 upwards by a little (FIG. 16A). Then, control unit 5 rotates media inject/eject belt 7 and delivers media 1 in a direction from tray 2 to drive 4 to inject media 1 into drive 4 (FIGS. 16B and 16C). When media 1 is injected into drive 4, control unit 5 records/plays back data of media 1 in drive 4. When the record/play back operation is completed, control unit 5 performs contrary operation to the media injection on media inject/eject belt 7 and tray 2 stores media 1 in drive 4.

By the above operation, the operation of the first exemplary embodiment is completed.

In the automatic changer of disc-like recording media disclosed in Japanese Patent Laid-Open No. 11-096641 described in the above, a subunit is a self-running type. As such, each subunit needs power, causing a problem of a complex mechanism for power to sift subunits for storing and transporting disc-like recording media.

The first exemplary embodiment brings, for example, effects as described below.

For example, the first exemplary embodiment has an effect of improving the object (e.g., media) storing capacity in a storage apparatus (e.g., library device). It is because the exemplary embodiment arranges a plurality of carriages including a first carriage for storing and transporting an object, a second carriage for storing and transporting an object, and a third carriage for storing and transporting an object in a matrix, and includes a shifting unit for shifting the third carriage to a different position from positions of the first and second carriages, and shifting the second carriage to a position of the third carriage when the first carriage shifts to the position of the second carriage.

Figure 15A:
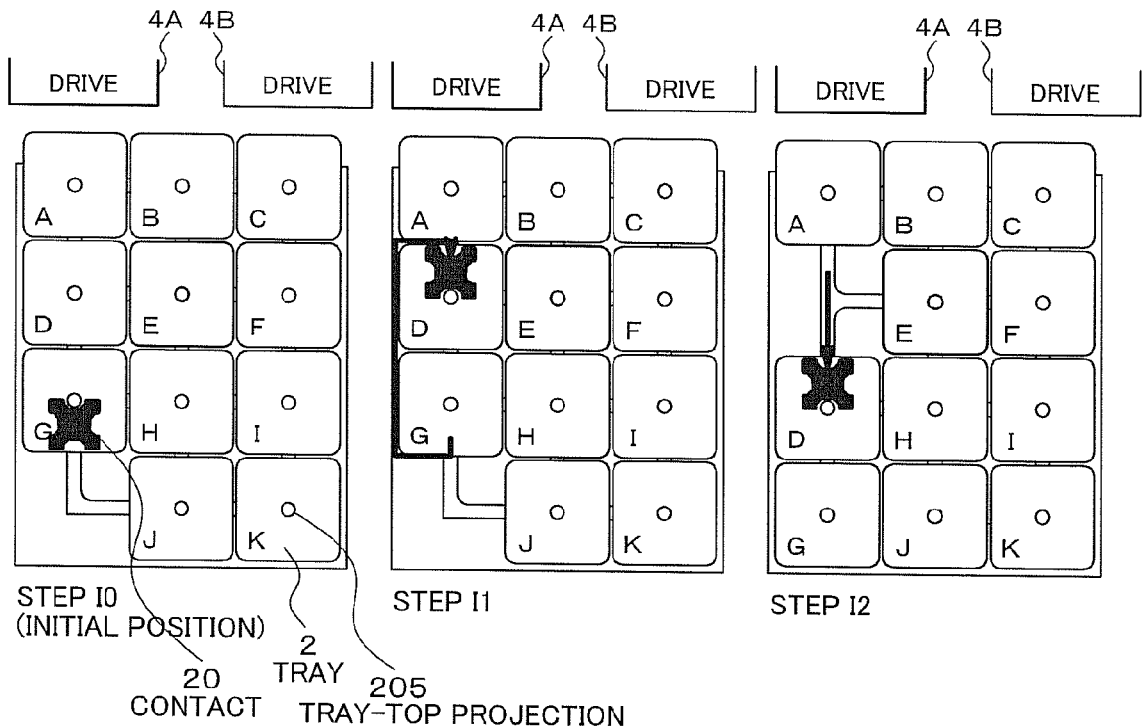
FIGS. 15A-D are exemplary drawings showing a specific operation example of the shifting unit according to the first exemplary embodiment.
Figure 15B:
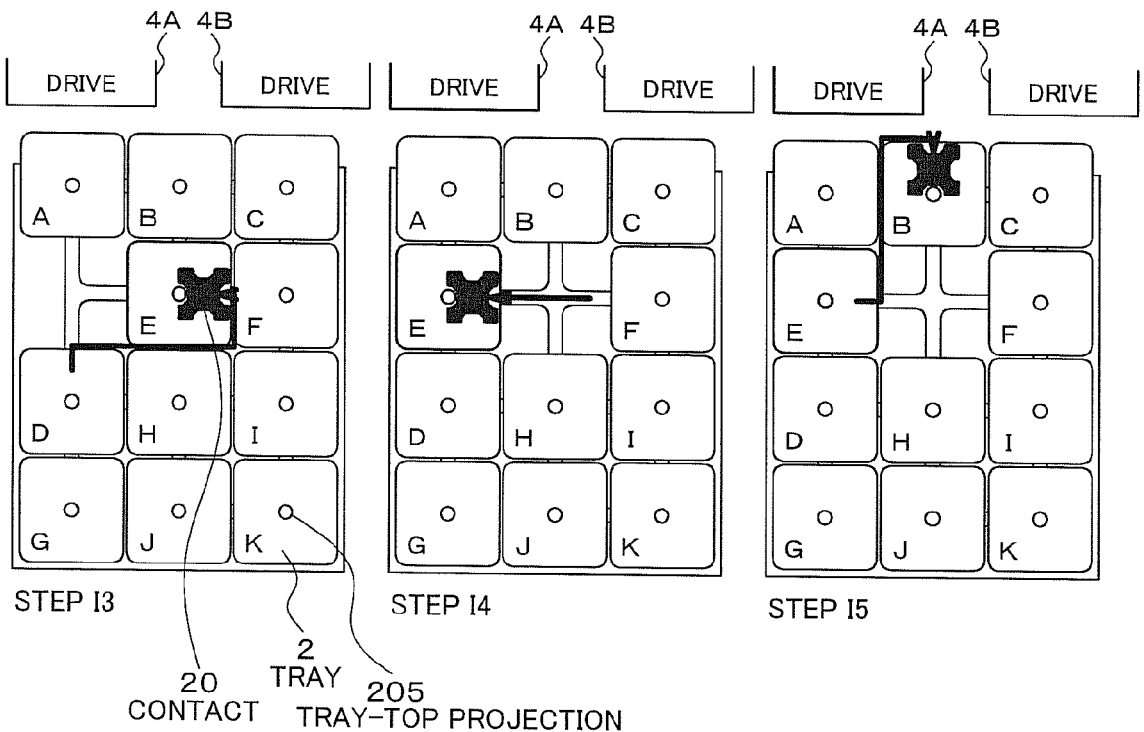
Figure 15C:
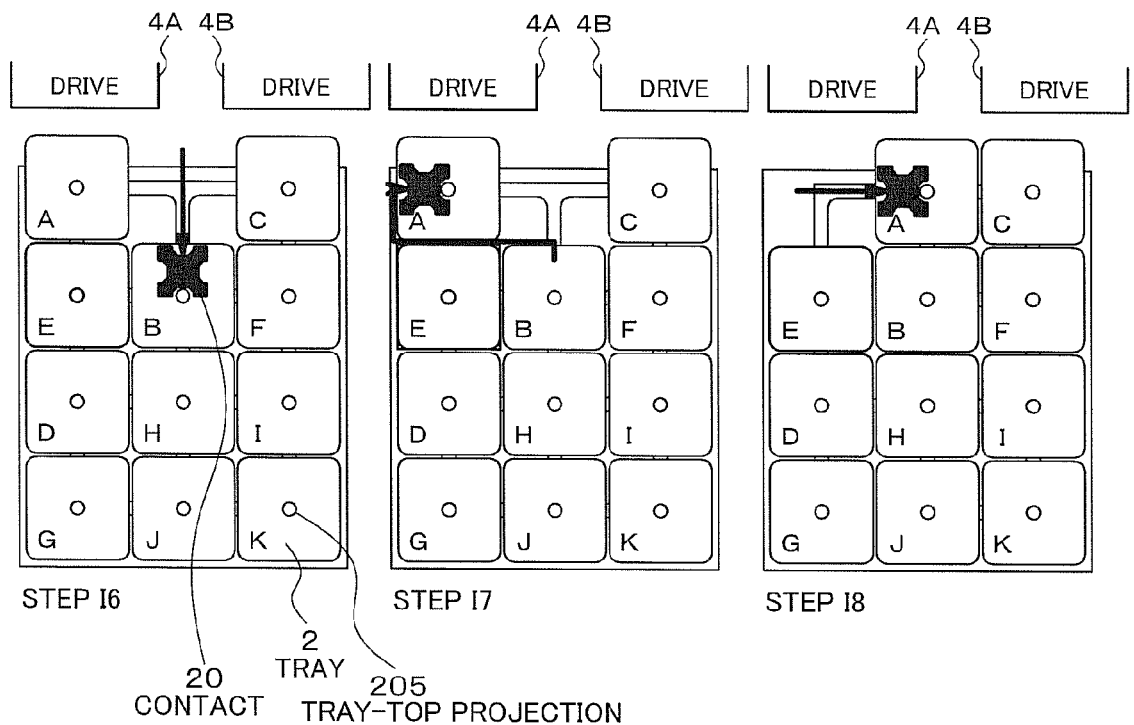
Figure 15D:
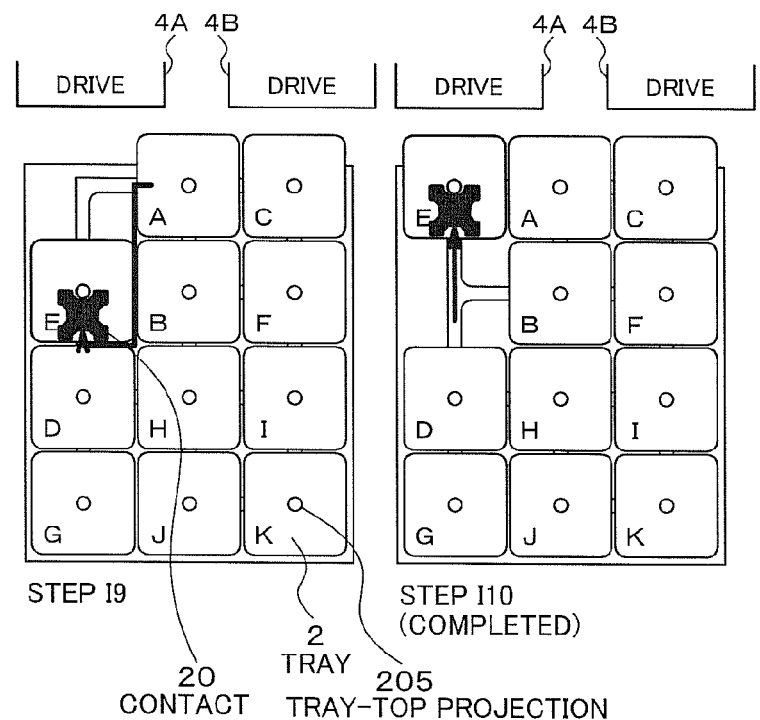

For example, in the circumstances at step I4 in FIG. 15B, when tray 2 "E" (first carriage) shifts to the position of the second subunit, tray 2 "A" (second carriage) needs to shift. However, in order for tray 2 "A" (second carriage) to shift, the tray 2 "A" needs to shift to the position of tray 2 "B" (third carriage), hence tray 2 "B" (third carriage) can be a block. However, according to the first exemplary embodiment, tray 2 "E" (first carriage) can be shifted to the destination position in such a case.

As a result, for example, according to the first exemplary embodiment, if media 1 are stored in certain (length)×(width) matrix arrangement, a shift area of tray 2 in the storage apparatus can be minimum (for one "tray 2"), thereby realizing a high-density storing capacity (according to the first exemplary embodiment, the storage apparatus can store (length×width−1) trays 2. In the automatic changer disclosed in Japanese Patent Laid-Open No. 11-096641, in the circumstances at step I0 in FIG. 15A, if tray 2 "H" shifts to the position of tray 2 "A", for example, the storage apparatus needs to reserve a shift area for tray 2 "H", i.e., a shift area for three "trays 2" (space in which no tray 2 is arranged) at the positions of trays 2 "A", "D" and "G".).

For example, the first exemplary embodiment also has an effect that it implements drive 4 as a half-height LTO drive, so that it can implement a small and thin library device with a high storing capacity of a 19" rack 1U size, and mounting eleven volumes of media 1 and two drives 4.

It is because the exemplary embodiment does not need an accessor so that the number of media storing areas increases, hence the exemplary embodiment can implement a small and thin device (instead of a thick device) and improve the object (e.g., media) storing capacity.

For example, the first exemplary embodiment also has an effect of simplifying the structure of a tray shifting mechanism. It is because operation needed to transport media is X and Y shifts only in the example of the first exemplary embodiment.

For example, the first exemplary embodiment also has an effect of simplifying a mechanism for power to shift carriages for storing and transporting objects. It is because the storage apparatus includes carriages that are arranged in a matrix and store and transport objects, and a carriage shifting mechanism to shift the carriages, wherein the carriage shifting mechanism is fixed to the storage apparatus. That is, the carriages are not self-running, but are shifted by the carriage shifting mechanism included in the outside of the carriage and fixed to storage apparatus.

As a more specific effect, for example, the first exemplary embodiment has an effect of implementing a small and thin device.

For example, if the carriages are self-running, each of the carriages needs a motor. However, the storage apparatus needs to include only a pre-determined number of motors for all of the carriages according to the first exemplary embodiment.

Further, for example, if the carriage is self-running, each carriage needs to include a transmission mechanism to transmit power. However, the storage apparatus needs to include a transmission mechanism to transmit power to all of the carriages, according to the first exemplary embodiment.

The first exemplary embodiment also produces an effect that a shift range does not tend to have a great restriction, for example. It is because transmission of power and a control signal to each carriage is performed with wires, so that structure such that cables do not get wound around one another and the corresponding complex control are needed, for example, if the carriages are self-running. However, according to the first exemplary embodiment, such structure such that cables do not get wound around one another and the corresponding complex control are not needed.

Figure 17:
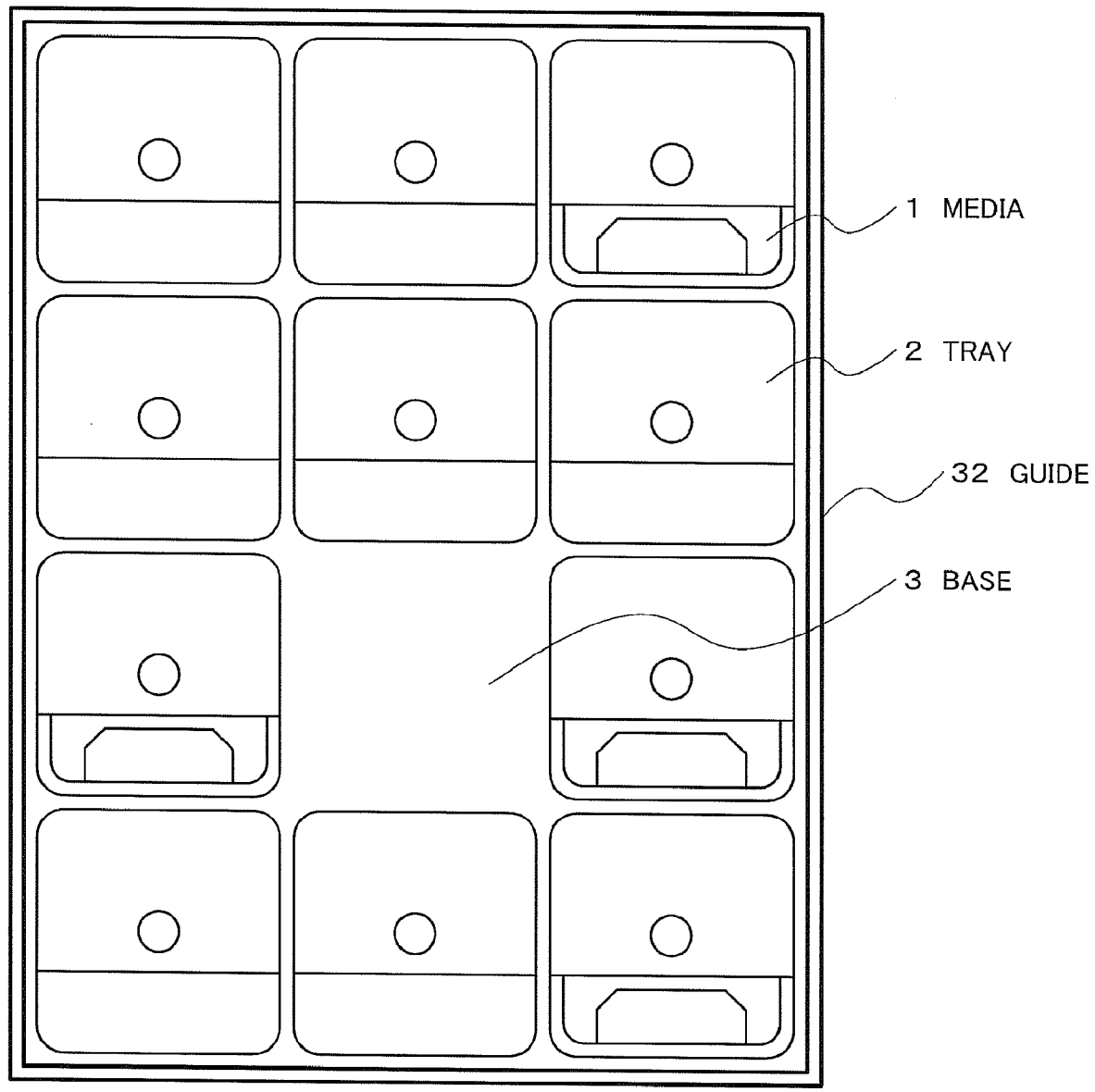
FIG. 17 is an exemplary drawing showing configuration of base 3 according to a second exemplary embodiment.

Next, a second exemplary embodiment will be described. The second exemplary embodiment is a variation of base 3, in which configuration of base 3 differs from that in the first exemplary embodiment. FIG. 17 is a exemplary drawing showing the configuration of base 3 according to the second exemplary embodiment. As shown in FIG. 17, base 3 according to the second exemplary embodiment does not include groove 31 in base 3 according to the first exemplary embodiment. Instead, base 3 includes guide 32 on the outermost of base 3. In addition, tray 2 does not include a tray-bottom projection.

Next, operation of the second exemplary embodiment will be described. In FIG. 17, a clearance between trays 2 and a clearance between tray 2 and guide 32 are reduced, so that tray 2 can shift on base 3 without displacement. As such, the second exemplary embodiment can operate equally to the first exemplary embodiment.

In the above way, the operation of the second exemplary embodiment is completed.

The second exemplary embodiment has an effect of simplifying structure of tray 2 and base 3, for example. It is because, for example, base 3 includes guide 32 on its outermost, and a clearance between trays 2 and a clearance between tray 2 and the guide 32 are reduced, so that tray 2 can shift on base 3 without groove 31 of base 3 and a tray-bottom projection of tray 2.

Next, a third exemplary embodiment will be described. The third exemplary embodiment is a variation of tray shifting mechanism 6. The third exemplary embodiment differs from the first exemplary embodiment in that shift means in the Z direction (upward/downward direction) is added to tray shifting mechanism 6.

In operation of the third exemplary embodiment, in order to position contact 20 at an arbitrary position, contact 20 shifts upwards to a height not to touch tray-top projection 205 of tray 2. Accordingly, the step of detouring tray-top projection 205 of tray 2 (step E2 in FIG. 11, FIG. 12) is unnecessary in order to shift contact 20 to a starting position in the operation of the first exemplary embodiment.

Two examples are illustrated herein as the shift means in the Z direction. The first one is an example for shifting only contact 20 in the Z direction, while the second one is an example for shifting X rail 21 attached with contact 20 and Y rail 24 in the Z direction.

Figure 18A:
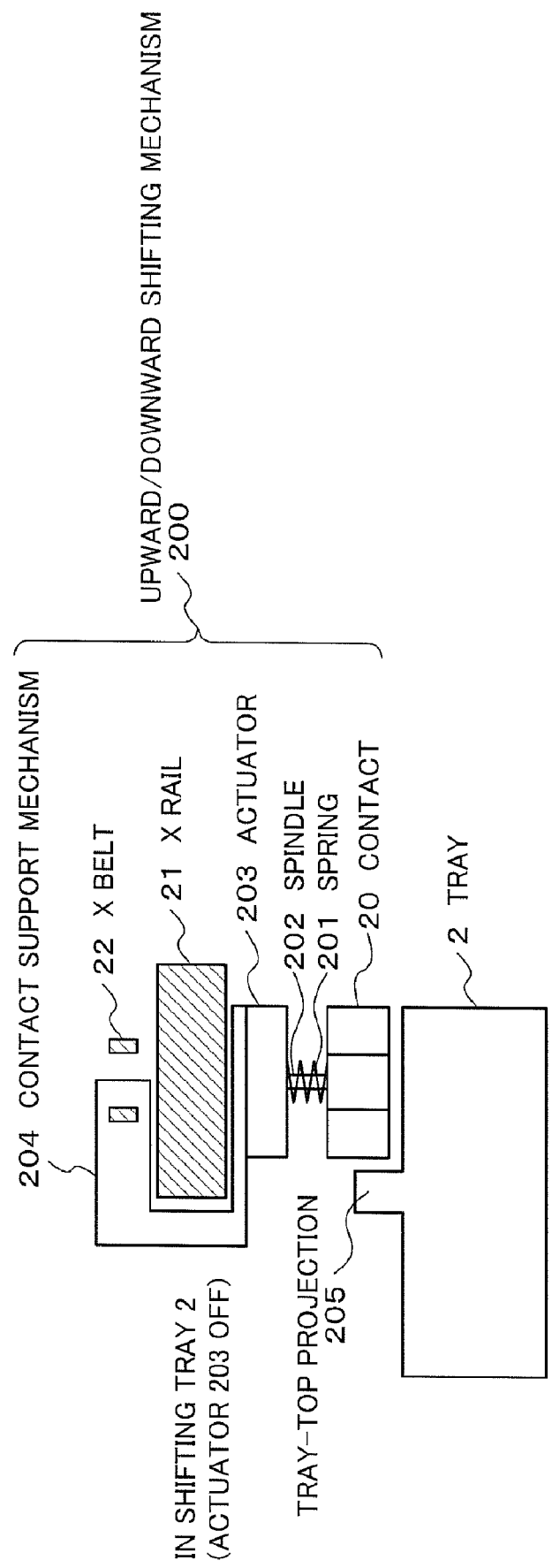
FIG. 18A is an exemplary drawing showing upward/downward shifting mechanism 200 of contact 20 according to a third exemplary embodiment (when tray 2 is shifted)
Figure 18B:
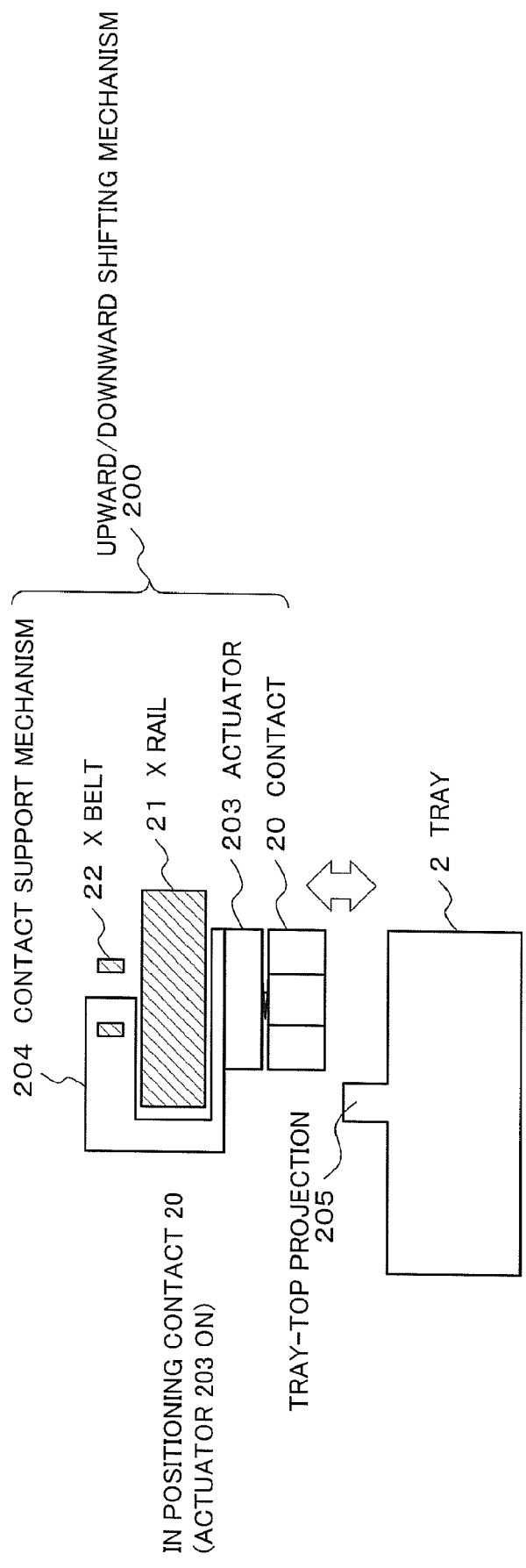
FIG. 18B is an exemplary drawing showing upward/downward shifting mechanism 200 of contact 20 according to the third exemplary embodiment (when contact 20 is positioned)

First, the first example is described for shifting only contact 20 in the Z direction. FIGS. 18A-B are exemplary drawings showing upward/downward shifting mechanism 200 of contact 20 according to the third exemplary embodiment. FIGS. 18A-B are cross-sectional views of contact 20 from the right side of the paper surface in FIG. 4. FIG. 18A shows the position of contact 20 when upward/downward shifting mechanism 200 shifts tray 2, while FIG. 18B shows the position of contact 20 when contact 20 is positioned at tray 2. Upward/downward shifting mechanism 200 includes spring 201, spindle 202, actuator 203, contact support mechanism 204.

Spring 201 biases contact 20 in a direction away from actuator 203.

Spindle 202 connects contact 20 and actuator 203.

Actuator 203 moves spindle 202 upwards/downwards so as to move contact 20 connected to spindle 202 upwards/downwards. Upward/downward shifting mechanism 200 may also use a motor instead of actuator 203 as a power source.

Contact support mechanism 204 is slidably attached to X rail 21. Contact support mechanism 204 shifts on X rail 21 with contact 20, spring 201, spindle 202 and actuator 203.

Next, operation of the first example will be described with reference to FIGS. 18A-B.

In order to position contact 20 at an arbitrary position such as a starting position or a waiting position, control unit 5 shifts contact 20 upwards to a height not to touch tray-top projection 205 of tray 2 (FIG. 18B), and shifts contact 20 in the X-Y directions. Then, in order to shift tray 2, control unit 5 shifts contact 20 downwards to a height to touch tray-top projection 205 of tray 2 (FIG. 18A), and shifts tray 2 in the X-Y directions by pushing tray 2.

Figure 19:
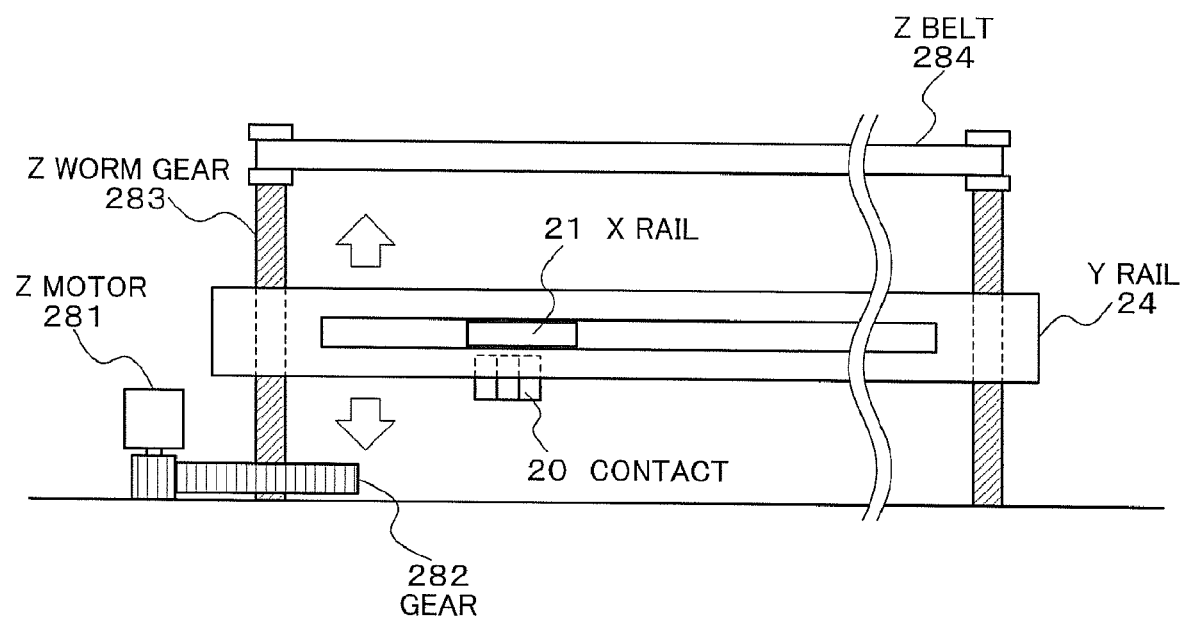
FIG. 19 is an exemplary drawing showing upward/downward shifting mechanism 280 of X rail 21 and Y rail 24 according to the third exemplary embodiment.

Next, the second example is illustrated in that X rail 21 attached with contact 20 and Y rail 24 are shifted in the Z direction. FIG. 19 is an exemplary drawing showing upward/downward shifting mechanism 280 of X rail 21 and Y rail 24 according to the third exemplary embodiment. FIG. 19 is a drawing of contact 20 viewed from the right side of the paper surface in FIG. 4.

Z motor 281 is a power source to rotate gear 282.

Gear 282 is concatenated to Z motor 281 and Z worm gear 283 and transmits power of Z motor 281 to Z worm gear 283.

Z worm gear 283 is engaged to Y rail 24 and shifts Y rail 24 upwards/downwards according to a rotation direction.

There are two Y rails 24 as shown in FIG. 4. One Y rail 24 not shown in FIG. 19 includes the same mechanism as upward/downward shifting mechanism 280. Alternatively, Y rail 24 not shown in FIG. 19 does not include Z motor 281, but may transmit power of Z motor 281 using a belt or the like.

Next, operation in the second example will be described with reference to FIG. 19. Rotation of Z motor 281 shifts Y rail 24 itself in the Z direction (moves upwards/downwards) via gear 282, z worm gear 283 and Z belt 284. This causes Z motor 281 to shift contact 20 in the Z direction.

Similarly to the first example, in order to position contact 20 at an arbitrary position such as a starting position or a waiting position, control unit 5 shifts contact 20 upwards to a height not to touch tray-top projection 205 of tray 2 to shift contact 20 in the X-Y directions. Then, in order to shift tray 2, control unit 5 shifts contact 20 downwards to a height to touch tray-top projection 205 of tray 2 to shift contact 20 in the X-Y directions.

Although Z worm gears 283 are arranged on both sides of Y rail 24 in this second example, Z worm gear 283 may be arranged only on the center of Y rail 24 and guides may be provided on both sides of Y rail 24. In that configuration, z belt 284 may be omitted, thereby realizing simple configuration.

In this way, operation of the third exemplary embodiment is completed.

The third exemplary embodiment has an effect of positioning contact 20 at a starting position to shift tray 2 in a short time, for example. It is because tray shifting mechanism 6 includes means for shifting contact 20 in the Z direction (upward/downward direction), and contact 20 does not need to detour tray-top projection 205 of each tray 2 since contact 20 shifts upwards when contact 20 is positioned, for example.

Figure 20:
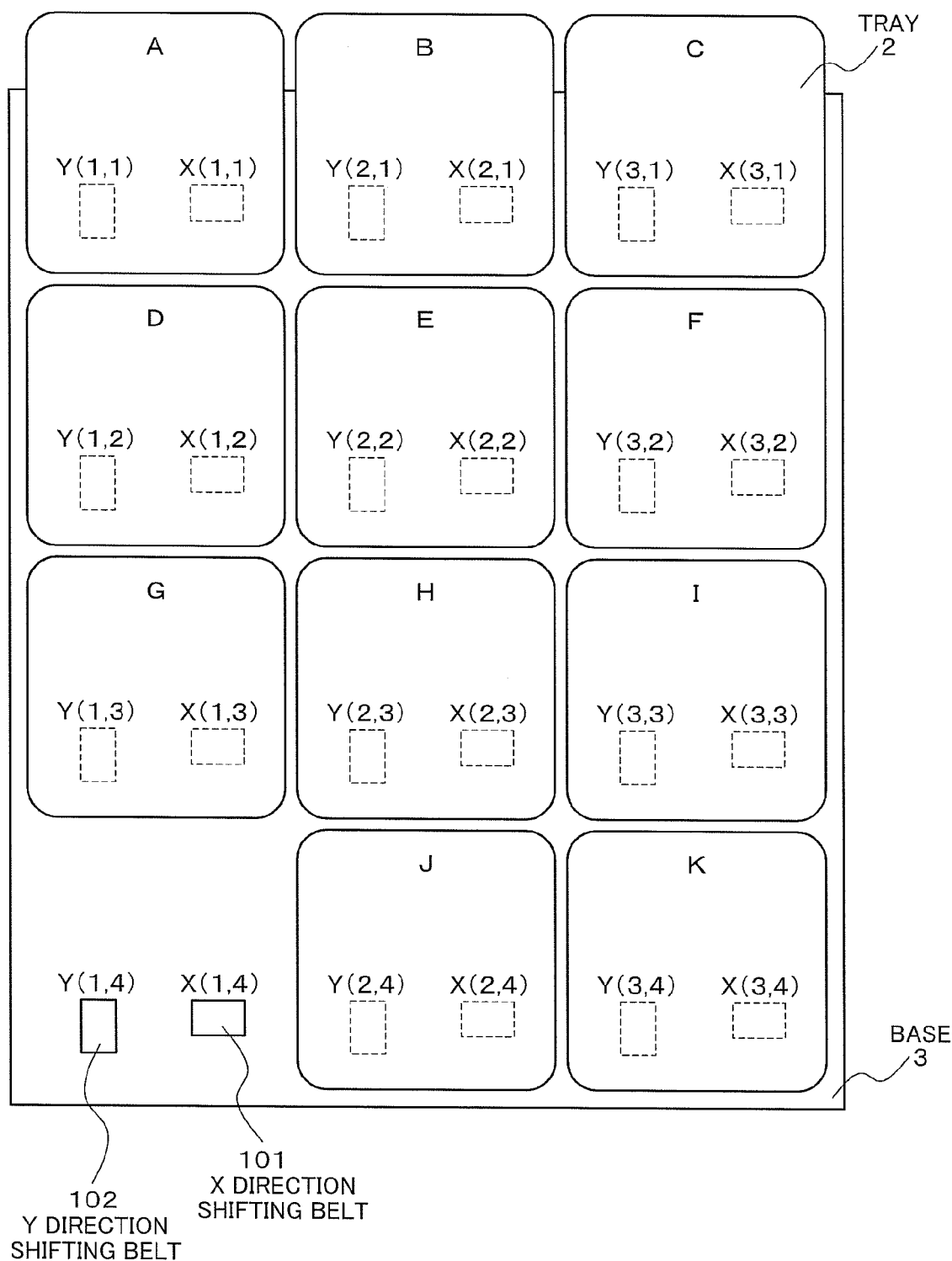
FIG. 20 is an exemplary drawing showing configuration of X tray shifting mechanism 6 according to a fourth exemplary embodiment.

Next, a fourth exemplary embodiment will be described. The fourth exemplary embodiment is another variation of tray shifting mechanism 6. The fourth exemplary embodiment differs from the first exemplary embodiment in that tray shifting mechanism 6 does not use contact 20, but uses X direction shifting belt 101 and Y direction shifting belt 102. FIG. 20 is an exemplary drawing showing configuration of tray shifting mechanism 6 according to the fourth exemplary embodiment.

Tray shifting mechanism 6 includes X direction shifting belt 101 and Y direction shifting belt 102. X direction shifting belt 101 and Y direction shifting belt 102 are attached in an element of a matrix.

X direction shifting belt 101 rotates with a motor (not shown) and shifts tray 2 in the X direction by friction.

Y direction shifting belt 102 rotates with a motor (not shown) and shifts tray 2 in the Y direction by friction.

FIG. 21 is an exemplary drawing showing upward/downward shifting mechanism 1010 for shifting X direction shifting belt 101 upwards/downwards according to the fourth exemplary embodiment. FIG. 21 is a cross-sectional view of X direction shifting belt 101 viewed from the lower side of a paper surface in FIG. 20. Upward/downward shifting mechanism 1010 includes belt seating 1011, spring 1012, spindle 1013 and actuator 1014. For simplifying explanation, upward/downward shifting mechanism 1010 of X direction shifting belt 101 will only be described, but Y direction shifting belt 102 also includes similar upward/downward shifting mechanism 1010.

Belt seating 1011 supports X direction shifting belt 101.

Spring 1012 biases belt seating 1011 in a direction to move away from actuator 1014. X direction shifting belt 101 and belt seating 1011 (including a belt rotation motor) have their empty weight, hence the spring 1012 may be omitted.

Spindle 1013 connects belt seating 1011 and actuator 1014.

Actuator 1014 moves spindle 1013 upwards/downwards, which causes belt seating 1011 connected to spindle 1013 to move upwards/downwards. Upward/downward shifting mechanism 1010 may use a motor instead of actuator 1014 as a power source. In that case, upward/downward shifting mechanism 1010 may use a worm gear to cooperate the motor instead of spindle 1013, and spring 1012 is omitted.

A mechanism similar to upward/downward shifting mechanism 1010 can move media inject/eject belt 7 shown in FIGS. 16A-C upwards/downwards.

According to the first exemplary embodiment, shift of contact 20 in the X and Y directions causes shift of tray 2. On the other hand, according to the fourth exemplary embodiment, a plurality of X direction shifting belts 101 and Y direction shifting belts 102 for shifting tray 2 are set on base 3, as shown in FIG. 20. That is, X direction shifting belts 101 and Y direction shifting belts 102, which can touch tray 2, shift tray 2 by friction.

Next, basic operation of the fourth exemplary embodiment will be described. The operation of the fourth exemplary embodiment differs from the first exemplary embodiment (FIGS. 11 and 12) in the operation of tray shifting mechanism 6.

X direction shifting belt 101 and Y direction shifting belt 102 normally position at a height not to touch tray 2. In order to shift tray 2, control unit 5 lifts up belts (either X direction shifting belt 101 or Y direction shifting belt 102) in tray 2 to be shifted, the space and a belt between tray 2 to be shifted and the space, to a height to touch the bottom of trays 2 and rotates the belts. For example, in order to shift tray 2 D in the Y downward direction in FIG. 20, control unit 5 lifts up Y direction shifting belts 102 (Y (1, 2), Y (1, 3), Y (1, 4)) and rotates the belts 102 to shift trays 2.

Next, operation according to the fourth exemplary embodiment will be described in detail. Specifically, shift control of tray shifting mechanism 6 will be described. In the shift control of tray shifting mechanism 6 according to the fourth exemplary embodiment, a belt attached for each matrix element in which tray 2 is arranged shifts tray 2 by friction. At this time, a belt needed to shift tray 2 operates.

The description will proceed based on the following assumptions. A position of a matrix element is defined as (X, Y), and trays 2 are arranged in a matrix on coordinates (X,Y). A position of the center of tray 2 to be shifted is defined as (X, Y)=(TX, TY), while a position of the center of a space being a matrix element not including tray 2 is defined as (X, Y)=(SX, SY). Choice and a shift direction of tray 2 to be shifted are decided according to the "shift algorithm of tray 2 in a matrix (see FIGS. 14A-B)" described before.

Shift control of basic tray shifting mechanism 6 proceeds as follows. Control unit 5 determines whether a shift direction of tray 2 is the X direction or the Y direction, identifies a belt to be operated, lifts the belt to be operated, rotates the belt for operating the surface touching tray 2 to shift in the shift direction, stops the operated belt, and lowers the operated belt.

Figure 22:
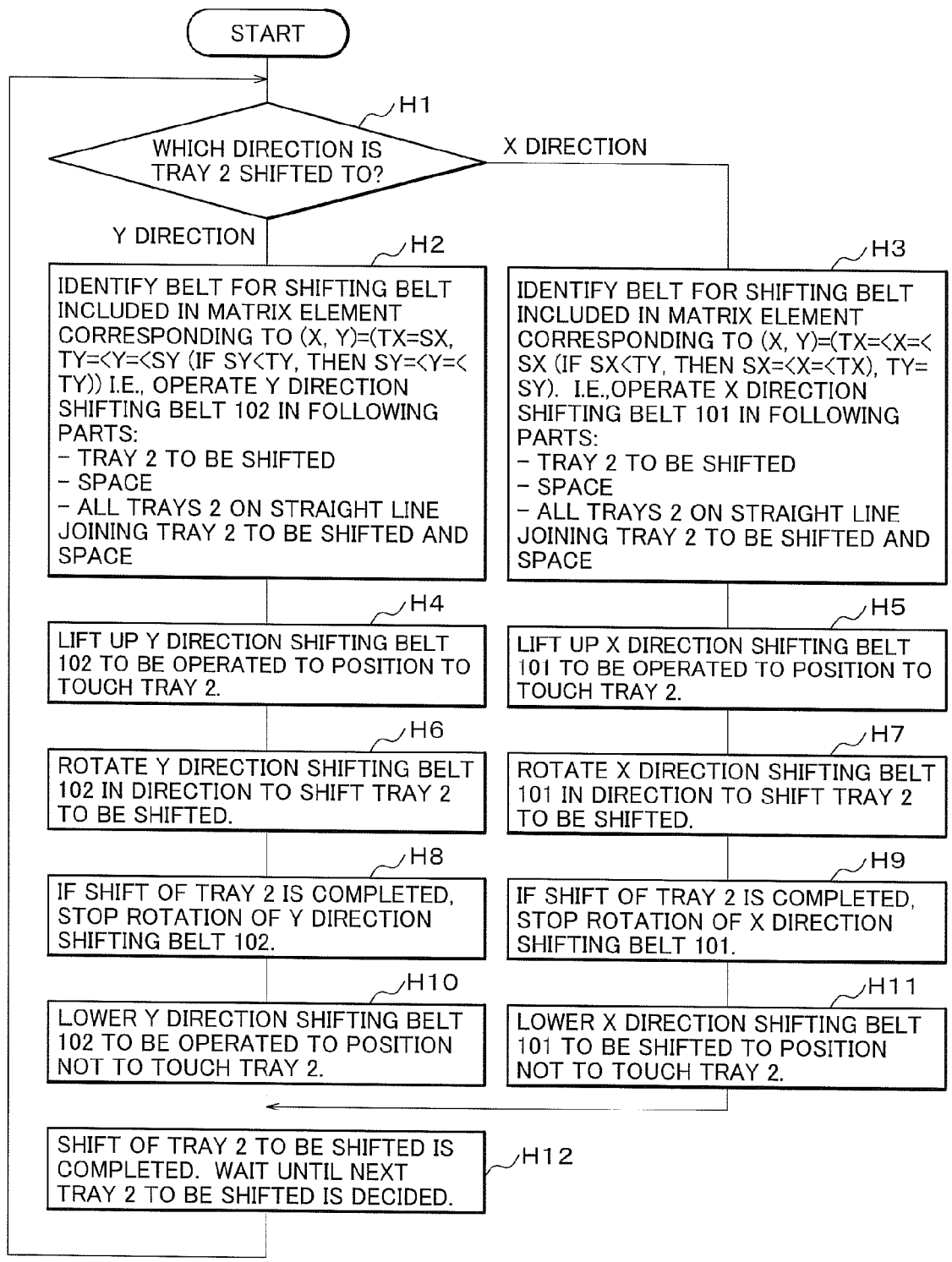
FIG. 22 is an exemplary flowchart showing shift control of tray shifting mechanism 6 according to the fourth exemplary embodiment.

Next, the operation will be described in more detail using a flowchart. FIG. 22 is an exemplary flowchart showing the shift control of tray shifting mechanism 6 according to the fourth exemplary embodiment. If a direction to shift tray 2 is the Y direction (step H1: Y direction), control unit 5 identifies a belt attached in a matrix element corresponding to (X, Y)=(TX=SX, TY=<Y=<SY (if SY<TY, then SY=<Y=<TY)) to be a belt to be operated. That is, control unit 5 decides Y direction shifting belts 102 in tray 2 to be shifted, a space, and all trays 2 on a straight line joining tray 2 to be shifted and the space as an operation target (step H2).

Control unit 5 lifts up Y direction shifting belt 102 to be operated to a position to touch tray 2 (step H4), and rotates Y direction shifting belts 102 in a direction to shift tray 2 to be shifted (step H6). If the shift of tray 2 is completed, control unit 5 stops rotation of Y direction shifting belts 102 (step H8), and lowers Y direction shifting belts 102 to be operated to a position not to touch tray 2 (step H10). Then, the shift of tray 2 to be shifted is completed. Tray shifting mechanism 6 waits until next tray 2 to be shifted is decided (step H12).

If a direction to shift tray 2 is the X direction (step H1: X direction), control unit 5 identifies a belt attached in a matrix element corresponding to (X, Y)=(TX=<X=<SX (if SX<TX, then SX=<X=<TX), TY=SY) to be a belt to be operated. That is, control unit 5 decides X direction shifting belts 101 in tray 2 to be shifted, a space, and all trays 2 on a straight line joining tray 2 to be shifted and the space as an operation target (step H3).

Control unit 5 lifts up X direction shifting belts 101 to be operated to a position to touch tray 2 (step H5), and rotates X direction shifting belts 101 in a direction to shift tray 2 to be shifted (step H7). If the shift of tray 2 is completed, control unit 5 stops rotation of X direction shifting belts 101 (step H9), and lowers X direction shifting belts 101 to be operated to a position not to touch tray 2 (step H11). Then, the shift of tray 2 to be shifted is completed. Tray shifting mechanism 6 waits until next tray 2 to be shifted is decided (step H12).

Next, shift control of tray shifting mechanism 6 according to the fourth exemplary embodiment will be described with reference to a specific example in FIGS. 20 and 22. In this example, tray 2 D ((TX, TY)=(1, 2)) in FIG. 20 is to be shifted in the Y downward direction. A coordinate position of a space is (SX, SY)=(1, 4).

Since a direction to shift tray 2 is the Y direction (step H1: Y direction), control unit 5 identifies a belt attached in a matrix element corresponding to (X, Y)=(TX=SX=1, TY=2=<Y=<SY=4) to be an operated belt. That is, control unit 5 decides Y (1, 2) in tray 2 D to be shifted, Y (1, 4) in a space, and Y (1, 3) in tray 2G on a straight line joining tray 2 to be shifted and the space as operated Y direction shifting belts 102 (step H2).

Control unit 5 lifts up Y direction shifting belts 102 (Y (1, 2), Y (1, 3), Y (1, 4)) to a height to touch tray 2 (step H4), and rotates Y direction shifting belts 102 (Y (1, 2), Y (1, 3), Y (1, 4)) to shift tray 2 in the Y downward direction (step H6). If shift of trays 2 D and G is completed, control unit 5 stops rotation of Y direction shifting belts 102 (Y (1, 2), Y (1, 3), Y (1, 4)) (step H8). Control unit 5 lowers Y direction shifting belts 102 (Y (1, 2), Y (1, 3), Y (1, 4)) to a position not to touch tray 2 (step H10). Tray shifting mechanism 6 waits until next tray 2 to be shifted is decided according to the "shift algorithm of tray 2 in a matrix" (step H12).

In this way, the operation of the fourth exemplary embodiment is completed.

The fourth exemplary embodiment has an effect of simplifying control of a tray shifting mechanism, for example. It is because, for example, tray shifting mechanism 6 shifts tray 2 using X direction shifting belt 101 and Y direction shifting belt 102 instead of contact 20, hence control to position contact 20 is not needed.

Next, a fifth exemplary embodiment will be described. The fifth exemplary embodiment is a variation of a media inject/eject mechanism, and configuration of the media inject/eject mechanism differs from that of the first exemplary embodiment. First, the configuration of the fifth exemplary embodiment will be described. FIGS. 23A-C are exemplary side views of the configuration of the media inject/eject mechanism according to the fifth exemplary embodiment. According to the first exemplary embodiment, the media inject/eject mechanism includes media inject/eject belt 7. However, means for injecting/ejecting media 1 may be various configurations such as a combination of a plurality of rollers instead of a belt. Any structure or configuration can be implemented in consideration of shapes of and a positional relation between tray 2 and drive 4. Herein, as one example, the media inject/eject mechanism is configured in a combination of lift roller 130 and roller 131. Lift roller 130 and roller 131 are arranged in front of each drive 4.

Next, operation of the fifth exemplary embodiment will be described. FIGS. 23A-C show operation to inject media 1 into drive 4. Control unit 5 lifts up lift roller 130 and uplifts media 1 upwards by a little (FIG. 23A). Control unit 5 rotates lift roller 130, and delivers media 1 in a direction from tray 2 to drive 4 (FIG. 23B). Next, control unit 5 rotates roller 131, and injects media 1 into drive 4 (FIG. 23C). When control unit 5 ejects media 1 from drive 4, control unit 5 causes lift roller 130 and roller 131 to operate and rotate in a contrary way to the media injection.

In the above way, the operation of the fifth exemplary embodiment is completed.

Next, a sixth exemplary embodiment will be described. According to the first to the fifth exemplary embodiments, the storage apparatus is a library device for storing media, as one example. Meanwhile, according to the sixth exemplary embodiment, a storage apparatus is a shipping storage for storing goods to be transported.

Next, a seventh exemplary embodiment will be described. According to the seventh exemplary embodiment, a storage apparatus is parking for storing (parking) automobiles.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A carriage shifting method comprising the steps of:
    shifting each carriage of a plurality of carriages arranged in a matrix, each carriage storing and transporting an object, where the shifting is performed by applying force from an outside of each carriage, wherein the shifting includes:
    moving each carriage by pushing with a single contact that is touchable to every carriage;
    shifting the contact to a starting position in the vicinity of the carriage to be shifted in an opposite direction to a shift direction of the carriage;
    shifting the carriage by the contact; and
    shifting the contact to a waiting position for waiting for a decision of a carriage to be shifted next, the waiting position being a position of the carriage from which the carriage has been most recently shifted.

2. The carriage shifting method according to claim 1, wherein the shifting the contact to the starting position includes:
    defining:
    a center position of the carriage as $(x, y)=(tx, ty)$; and
    a shift destination of the contact as $(x, y)=(dx, dy)$; and
    shifting the contact to the following positions:
    where a shift direction of the carriages is:
    a Y minus direction, then to $(dx, dy)=(tx, ty+\alpha)$;
    a Y plus direction, then to $(dx, dy)=(tx, ty-\alpha)$;
    an X minus direction, then to $(dx, dy)=(tx+\alpha, ty)$; and
    an X plus direction, then to $(dx, dy)=(tx-\alpha, ty)$;
    wherein the shifting the carriage includes:
    defining:
    a shift destination of the contact as $(x, y)=(dx, dy)$; and
    shifting the contact to the following positions:
    where a shift direction of the carriages is:
    a Y minus direction, then to $(dx, dy)=(dx, dy-\beta)$;
    a Y plus direction, then to $(dx, dy)=(dx, dy+\beta)$;
    an X minus direction, then to $(dx, dy)=(dx-\beta, dy)$; and
    an X plus direction, then to $(dx, dy)=(tx+\beta, ty)$; and
    wherein the shifting the contact to the waiting position includes:
    defining:
    a shift destination of the contact as $(x, y)=(dx, dy)$; and
    shifting the contact to the following positions:
    where a shift direction of the carriages is:
    a Y minus direction, then to $(dx, dy)=(dx, dy+\gamma)$;
    a Y plus direction, then to $(dx, dy)=(dx, dy-\gamma)$;
    an X minus direction, then to $(dx, dy)=(dx+\gamma, dy)$; and
    an X plus direction, then to $(dx, dy)=(dy-\gamma, dy)$.

3. The carriage shifting method according to claim 2, further comprising the step of:
    where a position of the matrix element is defined as $(X, Y)$, the carriages are arranged in a matrix on $(X, Y)$ coordinates, and it is defined that $\Delta X=1$ corresponds to $\Delta x=4$ and $\Delta Y=1$ corresponds to $\Delta y=4$,
    setting $\alpha=2$, $\beta=5$, $\gamma=1$.

4. The carriage shifting method according to claim 3, wherein the shifting the contact to the starting position further including:
    defining a position of the contact as $(x, y)=(cx, cy)$;
    finding a position of the carriages; and where $cx=4n$ ($n=0, 1, 2, 3$) and only a value of an x-coordinate is to be changed, shifting in a y direction ($y=+2$), shifting in the x direction, and then shifting in the y direction ($y=-2$), where $cx=4n$ ($n=0, 1, 2, 3$) and not only a value of an x-coordinate is to be changed, shifting in the y direction, and then shifting in the x direction, where $cx=4n$ ($n=0, 1, 2, 3$) does not hold and a value of a y-coordinate is only to be changed, shifting in the x direction ($x=+2$), shifting in the y direction, and then shifting in the x direction ($x=-2$), or where $cx=4n$ ($n=0, 1, 2, 3$) does not hold and not only a value of a y-coordinate is to be changed, shifting in the x direction, and then shifting in the y direction.

5. A storage apparatus comprising:

a plurality of carriages arranged in a matrix, each carriage to store and transport an object; and a carriage shifting mechanism to shift each carriage by applying force from an outside of each carriage, wherein the carriage shifting mechanism is to shift each carriage by:

moving each carriage by pushing with a single contact that is touchable to every carriage;

shifting the contact to a starting position in the vicinity of the carriage to be shifted in an opposite direction to a shift direction of the carriage;

shifting the carriage by the contact; and shifting the contact to a waiting position for waiting for a decision of a carriage to be shifted next, the waiting position being a position of the carriage from which the carriage has been most recently shifted.

6. The storage apparatus according to claim 5, wherein the shifting the contact to the starting position includes:

defining:

a center position of the carriage as $(x, y)=(tx, ty)$; and a shift destination of the contact as $(x, y)=(dx, dy)$; and shifting the contact to the following positions:

where a shift direction of the carriages is:

a Y minus direction, then to $(dx, dy)=(tx, ty+\alpha)$;

a Y plus direction, then to $(dx, dy)=(tx, ty-\alpha)$;

an X minus direction, then to $(dx, dy)=(tx+\alpha, ty)$; and an X plus direction, then to $(dx, dy)=(tx-\alpha, ty)$;

wherein the shifting the carriage includes:

defining:

a shift destination of the contact as $(x, y)=(dx, dy)$; and shifting the contact to the following positions:

where a shift direction of the carriages is:

a Y minus direction, then to $(dx, dy)=(dx, dy-\beta)$;

a Y plus direction, then to $(dx, dy)=(dx, dy+\beta)$;

an X minus direction, then to $(dx, dy)=(dx-\beta, dy)$; and an X plus direction, then to $(dx, dy)=(tx+\beta, ty)$; and wherein the shifting the contact to the waiting position includes:

defining:

a shift destination of the contact as $(x, y)=(dx, dy)$; and shifting the contact to the following positions:

where a shift direction of the carriages is:

a Y minus direction, then to $(dx, dy)=(dx, dy+\gamma)$;

a Y plus direction, then to $(dx, dy)=(dx, dy-\gamma)$;

an X minus direction, then to $(dx, dy)=(dx+\gamma, dy)$; and an X plus direction, then to $(dx, dy)=(dy-\gamma, dy)$.

7. The storage apparatus according to claim 6, further comprising:

where a position of the matrix element is defined as $(X, Y)$, the carriages are arranged in a matrix on $(X, Y)$ coordinates, and it is defined that $\Delta X=1$ corresponds to $\Delta x=4$ and $\Delta Y=1$ corresponds to $\Delta y=4$, setting $\alpha=2$, $\beta=5$, $\gamma=1$.

8. The storage apparatus according to claim 7, wherein the shifting the contact to the starting position further including:

defining a position of the contact as $(x, y)=(cx, cy)$;

finding a position of the carriages; and where $cx=4n$ ($n=0, 1, 2, 3$) and only a value of an x-coordinate is to be changed, shifting in a y direction ($y=+2$), shifting in the x direction, and then shifting in the y direction ($y=-2$), where $cx=4n$ ($n=0, 1, 2, 3$) and not only a value of an x-coordinate is to be changed, shifting in the y direction, and then shifting in the x direction, where $cx=4n$ ($n=0, 1, 2, 3$) does not hold and a value of a y-coordinate is only to be changed, shifting in the x direction ($x=+2$), shifting in the y direction, and then shifting in the x direction ($x=-2$), or where $cx=4n$ ($n=0, 1, 2, 3$) does not hold and not only a value of a y-coordinate is to be changed, shifting in the x direction, and then shifting in the y direction.

9. A non-transitory computer-readable storage medium storing a computer program that when executed by a storage apparatus causes the storage apparatus to perform a method comprising the steps of:

shifting each carriage of a plurality of carriages arranged in a matrix, each carriage storing and transporting an object, where the shifting is performed by applying force from an outside of each carriage, wherein the shifting includes:

moving each carriage by pushing with a single contact that is touchable to every carriage;

shifting the contact to a starting position in the vicinity of the carriage to be shifted in an opposite direction to a shift direction of the carriage;

shifting the carriage by the contact; and shifting the contact to a waiting position for waiting for a decision of a carriage to be shifted next, the waiting position being a position of the carriage from which the carriage has been most recently shifted.

* * * * *